(12) United States Patent
Saito

(10) Patent No.: US 12,041,337 B2
(45) Date of Patent: Jul. 16, 2024

(54) IMAGING CONTROL APPARATUS, IMAGING CONTROL METHOD, PROGRAM, AND IMAGING DEVICE

(71) Applicant: Sony Group Corporation, Tokyo (JP)

(72) Inventor: Taichi Saito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 201 days.

(21) Appl. No.: 17/635,936

(22) PCT Filed: Jun. 12, 2020

(86) PCT No.: PCT/JP2020/023241
§ 371 (c)(1),
(2) Date: Feb. 16, 2022

(87) PCT Pub. No.: WO2021/044692
PCT Pub. Date: Mar. 11, 2021

(65) Prior Publication Data
US 2022/0337743 A1 Oct. 20, 2022

(30) Foreign Application Priority Data

Sep. 3, 2019 (JP) .................. 2019-160511

(51) Int. Cl.
*H04N 23/611* (2023.01)
*G06T 7/70* (2017.01)
(Continued)

(52) U.S. Cl.
CPC ............. *H04N 23/611* (2023.01); *G06T 7/70* (2017.01); *G06V 10/22* (2022.01); *G06V 20/60* (2022.01);
(Continued)

(58) Field of Classification Search
None
See application file for complete search history.

(56) References Cited

U.S. PATENT DOCUMENTS 6,377,296 B1 4/2002 Zlatsin
7,028,269 B1 4/2006 Cohen-Solal
(Continued)

FOREIGN PATENT DOCUMENTS

CA 3041833 A1 * 5/2018 ............. A61B 6/037
CN 108093181 A 5/2018
(Continued)

OTHER PUBLICATIONS

English translation of JP-4078047-B2, Hamana, Apr. 2008 (Year: 2008).*

(Continued)

*Primary Examiner* — James M Hannett
(74) *Attorney, Agent, or Firm* — Oblon, McClelland, Maier & Neustadt, L.L.P.

(57) ABSTRACT

An imaging control apparatus includes an identification unit that identifies an object to be introduced and an object introducer who introduces the object to be introduced individually as subjects on the basis of captured image data obtained by an imaging unit of an imaging device, a selection unit that selects one of the object to be introduced and the object introducer as a target subject on the basis of a positional relationship between at least any two of the object to be introduced, the object introducer, and the imaging device, and an imaging control unit that performs imaging control on a subject selected as the target subject by the selection unit.

20 Claims, 15 Drawing Sheets

(51) Int. Cl.
*G06V 10/22* (2022.01)
*G06V 20/60* (2022.01)
*G06V 40/10* (2022.01)

(52) U.S. Cl.
CPC .. *G06V 40/113* (2022.01); *G06T 2207/30196* (2013.01); *G06V 2201/10* (2022.01)

(56) References Cited

U.S. PATENT DOCUMENTS

| | | | |
|---|---|---|---|
| 8,300,081 B1 * | 10/2012 | Sawyer | H04N 7/15 348/14.07 |
| 2004/0190753 A1 | 9/2004 | Sakagami | |
| 2008/0025710 A1 | 1/2008 | Sugimoto | |
| 2008/0118156 A1 | 5/2008 | Okada | |
| 2009/0244354 A1 | 10/2009 | Sakaguchi | |
| 2013/0107020 A1 | 5/2013 | Hashimoto | |
| 2014/0245367 A1 * | 8/2014 | Sasaki | H04N 21/2343 725/109 |
| 2015/0172531 A1 | 6/2015 | Ikeda | |

FOREIGN PATENT DOCUMENTS

| | | | | |
|---|---|---|---|---|
| CN | 108521862 A | | 9/2018 | |
| JP | 2003-168021 A | | 6/2003 | |
| JP | 2004112511 A | * | 4/2004 | |
| JP | 2005351925 A | | 12/2005 | |
| JP | 4078047 B2 | * | 4/2008 | |
| JP | 2011-87183 A | | 4/2011 | |
| JP | 2018-33013 A | | 3/2018 | |
| WO | WO-2021035223 A1 | * | 2/2021 | ......... G06F 3/04847 |

OTHER PUBLICATIONS

English translation of JP-2004112511-A, Kimura, Apr. 2004 (Year: 2004).*
International Search Report mailed on Sep. 1, 2020 in PCT/JP2020/023241 filed on Jun. 12, 2020 (2 pages).

* cited by examiner

IMAGING CONTROL APPARATUS, IMAGING CONTROL METHOD, PROGRAM, AND IMAGING DEVICE

TECHNICAL FIELD

The present technology relates to an imaging control apparatus, an imaging control method, a program, and an imaging device, and more particularly, relates to a technology of imaging control suited to a subject.

BACKGROUND ART

Technologies to perform various types of processing related to imaging such as focus control on moving images captured by imaging devices are known.

CITATION LIST

Patent Document

Patent Document 1: Japanese Patent Application Laid-Open No. 2018-33013

SUMMARY OF THE INVENTION

Problems to be Solved by the Invention

Meanwhile, these days, it is popular among users to post videos shot by themselves with an imaging device such as a digital video camera or a smartphone on video posting sites, social networking services (SNSs), etc.

Under such environments, users themselves are often a subject. It is difficult for users to operate an imaging device by themselves, and thus it can be difficult to properly adjust the operation of the imaging device. Then, an automatic function such as autofocus is often used, but is sometimes difficult to properly operate.

Then, the present disclosure proposes a technology that allows functions related to imaging to be properly operated.

Solutions to Problems

An imaging control apparatus according to the present technology includes an identification unit that identifies an object to be introduced and an object introducer who introduces the object to be introduced individually as subjects on the basis of captured image data obtained by an imaging unit of an imaging device, a selection unit that selects one of the object to be introduced and the object introducer as a target subject on the basis of a positional relationship between at least any two of the object to be introduced, the object introducer, and the imaging device, and an imaging control unit that performs imaging control appropriate to a subject selected as the target subject by the selection unit.

The object to be introduced is, for example, an article, a product, or the like that is a subject. The object introducer is, for example, a person who is a subject. Then, the imaging control is determined by estimating which of the object to be introduced and the object introducer is a main subject on the basis of the positional relationship between any two of the object to be introduced, the object introducer, and the imaging device.

As the imaging control, for example, autofocus control, auto exposure (AE) control (aperture control, shutter speed (SS) control, and gain control), etc. are assumed as control of imaging operation of the imaging unit. Furthermore, as the imaging control, control of image processing on the captured image data is also considered. For example, signal processing control such as white balance processing and contrast adjustment processing is also assumed.

Note that the positional relationship between at least any two of the object to be introduced, the object introducer, and the imaging device is assumed to be a positional relationship between the object introducer and the object to be introduced, a positional relationship between the object to be introduced and the imaging device, a positional relationship between the imaging device and the object introducer, positional relationships between the object introducer, the object to be introduced, and the imaging device, or the like.

In the above-described imaging control apparatus according to the present technology, the selection unit may select one of the object to be introduced and the object introducer as the target subject on the basis of the positional relationship between the object to be introduced and the object introducer.

There is a case where a scene or a situation can be estimated on the basis of the positional relationship between the object to be introduced and the object introducer, and thus the target subject is selected using it.

In the above-described imaging control apparatus according to the present technology, the selection unit may select one of the object to be introduced and the object introducer as the target subject on the basis of the positional relationship between the object to be introduced and the imaging device.

There is a case where a scene or a situation can be estimated on the basis of the positional relationship between the object to be introduced and the imaging device, and thus the target subject is selected using it.

In the above-described imaging control apparatus according to the present technology, the identification unit may identify the object to be introduced by recognizing the object to be introduced on the basis of the captured image data.

That is, an article or the like to be introduced is directly identified by image recognition.

In the above-described imaging control apparatus according to the present technology, the identification unit may recognize a hand of the object introducer on the basis of the captured image data, and identify the object to be introduced on the basis of a result of the recognition of the hand.

For example, even if the object to be introduced cannot be directly identified or is not directly identified, the object to be introduced can be indirectly identified on the basis of the result of the recognition of the hand.

In the above-described imaging control apparatus according to the present technology, the identification unit may hypothetically identify, as a substitute for a true object to be introduced, the hand as the object to be introduced.

For example, in a case where a case is assumed in which the hand is holding the object to be introduced, the object to be introduced can be identified by the recognition of the hand.

In the above-described imaging control apparatus according to the present technology, the identification unit may identify the object to be introduced on the basis of a state of the hand.

For example, the object to be introduced is identified on the basis of the fact that the hand that is a part of the body of the object introducer is in the state of, for example, holding, pinching, or grasping an article or the like.

In the above-described imaging control apparatus according to the present technology, the selection unit may select one of the object to be introduced and the object introducer as the target subject on the basis of the object to be introduced and the positional relationship between the object to be introduced and the object introducer depending on the state of the hand of the object introducer.

In this case, the state of the hand is also a state in which the hand that is a part of the body of the object introducer holds, pinches, or grasps an article or the like, for example. On the basis of the positional relationship accompanying these states, the target subject selection is performed.

In the above-described imaging control apparatus according to the present technology, the state of the hand may be a state in which the hand of the object introducer is in contact with the object to be introduced.

On the basis of the fact that the hand is in contact with an article or the like, the article or the like is identified as the object to be introduced.

In the above-described imaging control apparatus according to the present technology, the state of the hand may be a state in which the hand of the object introducer is pointing at the object to be introduced.

On the basis of the fact that the hand is pointing at an article or the like, the article or the like is identified as the object to be introduced.

In the above-described imaging control apparatus according to the present technology, the selection unit may select one of the object to be introduced and the object introducer as the target subject on the basis of a distance relationship between at least any two of the object to be introduced, the object introducer, and the imaging device, which is the positional relationship.

The positional relationship can be considered to be the distance relationship between them. In this case, the imaging control is determined by estimating which of the object to be introduced and the object introducer is a main subject on the basis of the distance relationship, its change, or the like.

In the above-described imaging control apparatus according to the present technology, the distance relationship may be a distance between the object to be introduced and the imaging device.

There is a case where a scene or a situation can be estimated on the basis of the distance relationship between the object to be introduced and the imaging device, and thus the target subject is selected using it.

In the above-described imaging control apparatus according to the present technology, the distance relationship may be a distance between the object introducer and the object to be introduced.

There is a case where a scene or a situation can be estimated on the basis of the distance relationship between the object to be introduced and the object introducer, and thus the target subject is selected using it.

In the above-described imaging control apparatus according to the present technology, the distance relationship may be distances between the object introducer, the object to be introduced, and the imaging device.

There is a case where a scene or a situation can be estimated on the basis of the respective distance relationships between the object to be introduced, the object introducer, and the imaging device, and thus the target subject is selected using it.

In the above-described imaging control apparatus according to the present technology, the selection unit may detect the distance relationship on the basis of the ratio of the region of at least one of the object to be introduced or the object introducer to the entire frame of the captured image data.

For example, on the basis of the fact that the ratio of the object to be introduced on the captured image has become greater than a predetermined, the object to be introduced is determined as the target subject, and the imaging control is executed.

The above-described imaging control apparatus according to the present technology may further include a presentation control unit that performs presentation control to present, to the object introducer, a difficult control state in which the imaging control is difficult in a case where the distance between the imaging device and the object to be introduced is shorter than a predetermined value.

For example, it is made possible to notify the user of a state in which the subject is too close to be properly imaged.

The above-described imaging control apparatus according to the present technology may further include an association control unit that performs association control to associate metadata related to a result of the selection by the selection unit with the captured image data.

For example, it is made possible to determine which is the target subject as a target of the imaging control using the metadata at a later point in time such as at the time of reproduction.

An imaging device of the present technology includes an imaging unit and the above imaging control apparatus. For example, an information processing device in the imaging device functions as the imaging control apparatus.

An imaging method of the present technology is an imaging method including identification processing to identify an object to be introduced and an object introducer who introduces the object to be introduced individually as subjects on the basis of captured image data obtained by an imaging unit of an imaging device, selection processing to select one of the object to be introduced and the object introducer as a target subject on the basis of a positional relationship between at least any two of the object to be introduced, the object introducer, and the imaging device, and imaging control processing to perform imaging control appropriate to a subject selected as the target subject in the selection unit. This allows proper setting of a subject that should be subjected to the imaging control at the time of imaging.

A program according to the present technology is a program that causes an imaging control apparatus to execute processing corresponding to the imaging control method as described above. This allows the above-described imaging control apparatus to be implemented by an information processing device, a microcomputer, or the like.

MODE FOR CARRYING OUT THE INVENTION

Figure 1:
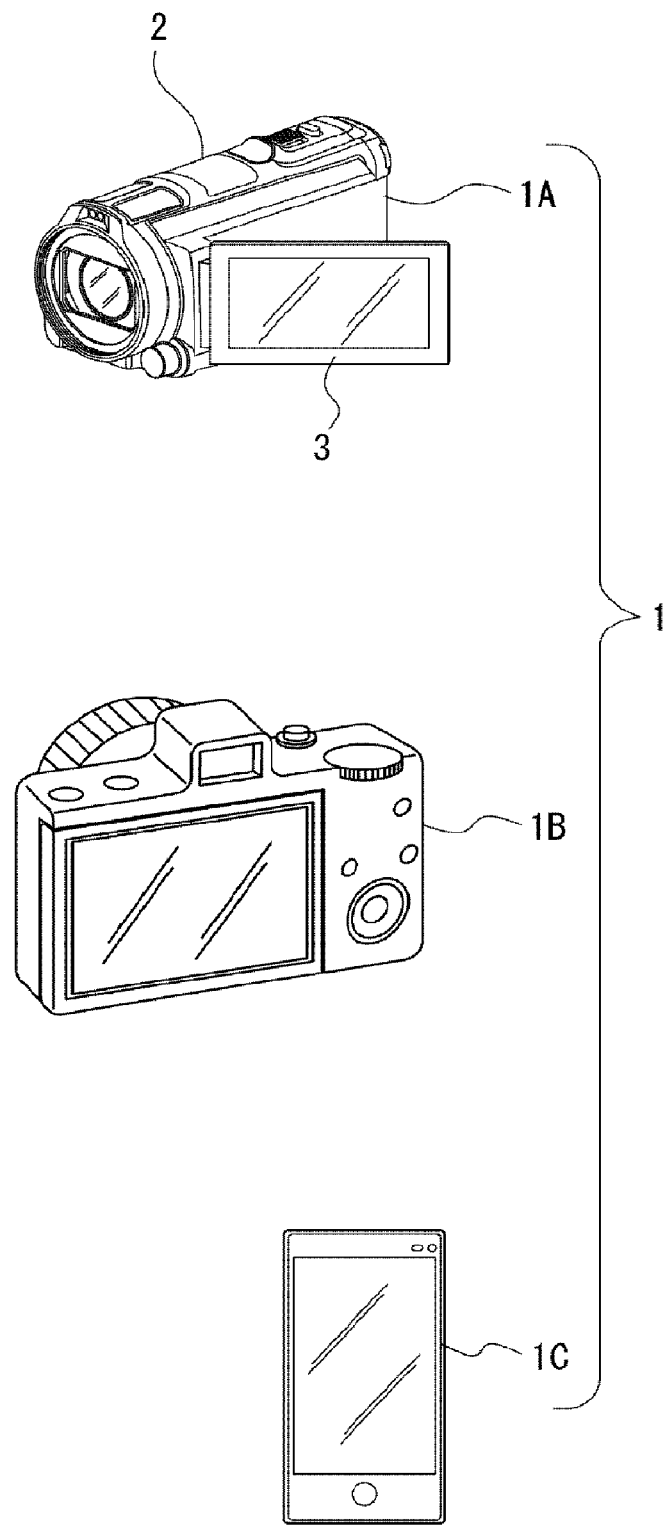
FIG. 1 is an explanatory diagram of devices used in embodiments of the present technology.

Hereinafter, embodiments will be described in the following order.

<1. Configuration of Devices Applicable as Imaging control apparatus>
<2. Configuration of imaging device>
<3. Outline of scene determination and control of imaging>
<4. Processing to implement embodiments>
<5. Summary and modifications>

Note that contents and structures once described are denoted by the same reference numerals thereafter to omit explanations.

The present technology identifies an object to be introduced and an object introducer who introduces the object to be introduced on the basis of the inside of captured image data obtained by capturing moving images. Then, for example, on the basis of the positional relationship between at least any two of the object to be introduced, the object introducer, and an imaging device, one of the object to be introduced and the object introducer is selected as a target subject. Imaging control suitable for the region of a subject selected as the target subject is performed.

The present embodiment describes, as an example, an imaging device that performs proper imaging control on the image region of an object to be introduced or an object introducer in the shooting a video to be posted on a video posting site, an SNS, or the like.

Here, as an example of the video to be posted, a product review video in which a video poster introduces a product will be described as an example.

Then, in the product review video, a product to be introduced and an object introducer who introduces the product are imaged by the imaging device. The object introducer is mostly the video poster, and is a person who introduces the product by himself or herself in the product review video.

In the present embodiment, a situation is assumed in which the object introducer shoots the product review video by taking a video of himself or herself with the imaging device fixed.

Here, the object to be introduced refers to an article. In the present embodiment, the product will be described as an example of the article. Note that the article referred to here need not be an object of a commercial transaction, and may be, for example, a work or the like created by himself or herself.

Furthermore, in the embodiments, the product review video is assumed to include a performance scene and a product introduction scene.

The performance scene is a scene for imaging the performance of the object introducer such as the self-introduction of the object introducer and the outlining of the product. The product introduction scene is a scene for imaging the shape and operation of the product, the manner in which the product is actually used, and the like.

The imaging device according to the present embodiment determines whether the product review video is either the performance scene or the product introduction scene on the basis of, for example, the positional relationship between at least any two of the object to be introduced, the object introducer, and the imaging device, and selects the target subject depending on each scene. Then, imaging control suited to the selected target subject is performed.

1. CONFIGURATION OF DEVICES APPLICABLE AS IMAGING CONTROL APPARATUS

The following describes an example in which an imaging control apparatus according to the present disclosure is implemented mainly by the imaging device.

The imaging control apparatus according to the embodiments of the present disclosure takes a form of being incorporated in various devices, particularly, the imaging device.

FIG. 1 illustrates device examples that can be an imaging device 1.

A device that can be the imaging device 1 is a device having the function of capturing moving images, and may be a digital video camera LA, a digital still camera 1B, a mobile terminal 1C such as a smartphone, etc. The imaging control apparatus is incorporated in the imaging device 1 mentioned above, for example.

Note that the imaging device 1 is not limited to the above examples, and may be any device that can include the imaging control apparatus or any device controlled by the imaging control apparatus, and may be of various other types. Furthermore, the imaging control apparatus may be provided as a separate body other than being incorporated in the imaging device 1.

In the imaging device 1, a microcomputer or the like inside the imaging device 1 performs imaging control.

The imaging control refers to the control of imaging of the imaging device 1, and is, for example, imaging operation control that is control of an optical system and a light receiving operation for concentrating subject light onto an image sensor (imaging element) of an imaging unit, and captured image processing control that is control over signal processing on captured image data.

For the imaging operation control, for example, autofocus control, AE control (aperture control, SS control, and gain control), zoom control, etc. are assumed.

Furthermore, for the captured image processing control, for example, white balance processing control, contrast adjustment processing control, image effect processing control, etc. are assumed.

In the imaging device 1, light receiving and imaging operation and image signal processing are performed according to the imaging operation control and the captured image processing control, and captured images are output. That is, captured images are recorded in a recording medium and displayed on a display unit.

As described above, various devices function as the imaging control apparatus according to the embodiments. The following describes an example in which the imaging device 1 as the digital video camera 1A is provided as the imaging control apparatus of the present disclosure.

2. CONFIGURATION OF IMAGING DEVICE

A configuration example of the digital video camera 1A as the imaging device 1 will be described with reference to FIG. 2.

Figure 2:
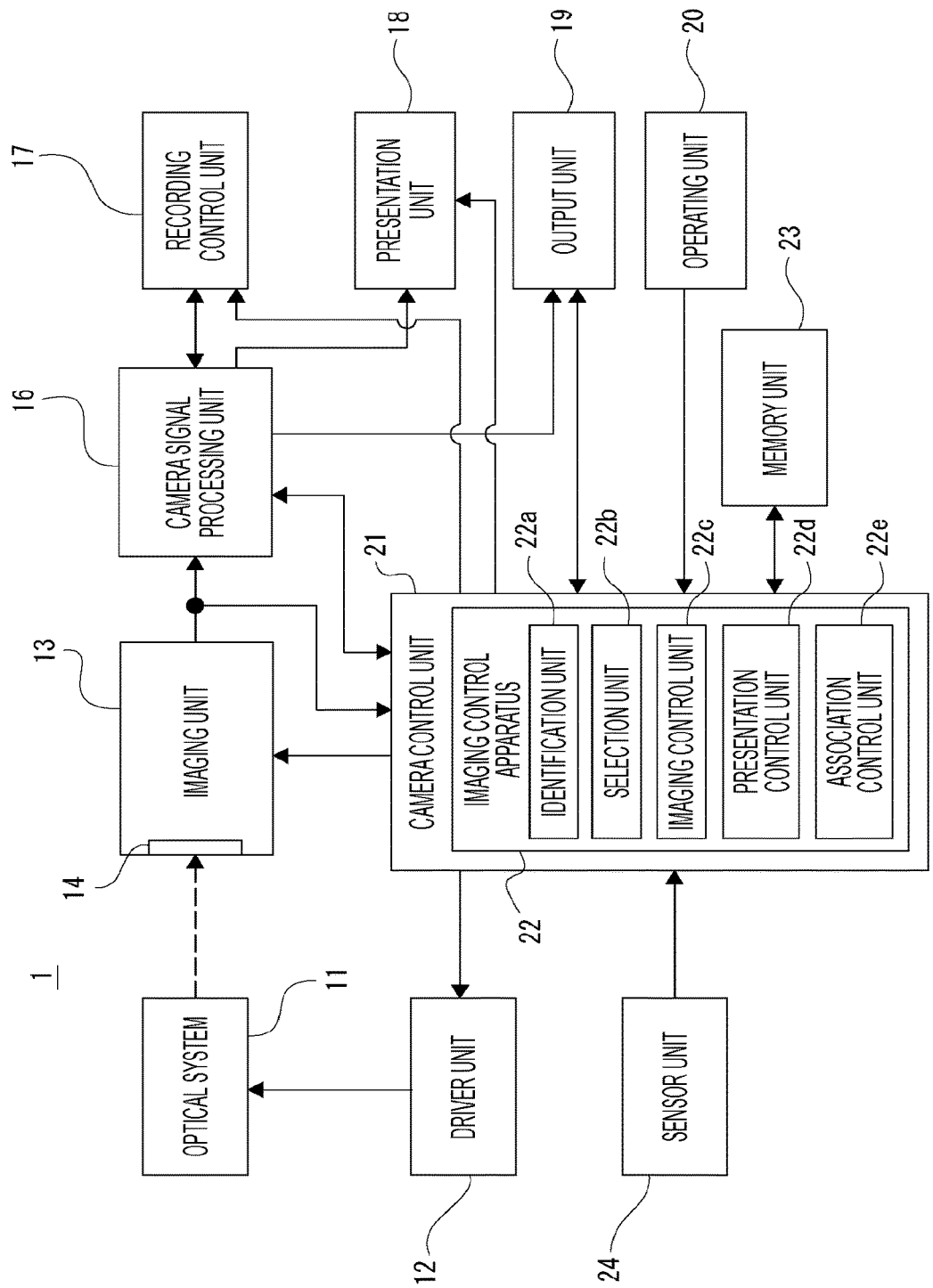
FIG. 2 is a block diagram of an imaging device according to the embodiments.

As illustrated in FIG. 2, the imaging device 1 includes an optical system 11, a driver unit 12, an imaging unit 13, a camera signal processing unit 16, a recording control unit 17, a presentation unit 18, an output unit 19, an operating unit 20, a camera control unit 21, a memory unit 23, and a sensor unit 24.

The optical system 11 includes lenses such as a zoom lens and a focus lens, a diaphragm mechanism, etc. The optical system 11 guides light from a subject (incident light) and concentrates the light onto the imaging unit 13.

The driver unit 12 is provided with, for example, a motor driver for a zoom lens drive motor, a motor driver for a focus lens drive motor, a motor driver for a diaphragm mechanism drive motor, a shutter driver for a shutter drive motor, etc.

According to instructions from the camera control unit 21 and the camera signal processing unit 16, the driver unit 12 applies drive current to the corresponding drivers to cause them to perform the movement of the focus lens and the zoom lens, the opening and closing of diaphragm blades of the diaphragm mechanism, shutter operation, and so on.

The diaphragm mechanism is driven by the diaphragm mechanism drive motor to control the amount of light incident on the imaging unit 13 described later. The focus lens is driven by the focus lens drive motor to be used for focus adjustment. The zoom lens is driven by the zoom lens drive motor to be used for zoom adjustment. The shutter mechanism is driven by the shutter drive motor to perform the shutter operation.

The imaging unit 13 includes, for example, an image sensor 14 (imaging element) of a complementary metal oxide semiconductor (CMOS) type, a charge-coupled device (CCD) type, or the like. The image sensor 14 includes imaging pixels for capturing an image of a subject and image-plane phase difference pixels for detecting a phase difference in an optical image of a subject. Note that the image sensor 14 may not include phase difference pixels.

The imaging unit 13 performs, for example, correlated double sampling (CDS) processing, automatic gain control (AGC) processing, etc. and further performs analog-to-digital (A/D) conversion processing on an electric signal obtained by photoelectrically converting light received by the image sensor 14. The imaging unit 13 outputs a captured image signal as digital data to the camera signal processing unit 16 and the camera control unit 21.

The image sensor 14 includes a plurality of imaging pixels. Each imaging pixel stores a charge corresponding to the intensity of received light.

The image sensor 14 may be covered with, for example, a Bayer array color filter. A captured image signal can be read from an electric signal obtained by photoelectrically converting light received by the imaging pixel groups.

The image sensor 14 outputs the captured image signal to the camera signal processing unit 16 and the camera control unit 21.

The image sensor 14 may include image-plane phase difference pixels. The image-plane phase difference pixels detect phase difference information. The image-plane phase difference pixels detect a pair of phase difference signals. The imaging unit 13 outputs the pair of phase difference signals detected by the image-plane phase difference pixels. The phase difference signals are used, for example, in a correlation calculation for calculating the distance from the imaging device 1 to the object to be introduced or the object introducer.

Note that the image sensor 14 does not necessarily have to be provided with image-plane phase difference pixels. To calculate the distance from the imaging device 1 to the product to be introduced or the object introducer, a dedicated phase difference sensor, a time-of-flight (TOF) sensor, or the like disposed separately from the image sensor 14 may be used. Furthermore, for the distance from the imaging device 1 to the product or the object introducer, a value corresponding to the distance may be determined instead of detecting the distance itself. For example, the region size (the number of pixels included in the region) of the product or the object introducer in a captured image, position information on the focus lens, or the like is information indirectly indicating the distance from the imaging device 1.

The imaging unit 13 outputs the phase difference signals to the camera signal processing unit 16 and the camera control unit 21.

The camera signal processing unit 16 is configured as an image processing processor by, for example, a digital signal processor (DSP) or the like.

The camera signal processing unit 16 performs various types of signal processing on the digital signal (captured image signal) from the imaging unit 13. For example, the camera signal processing unit 16 performs preprocessing, synchronization processing, YC generation processing, various types of correction processing, resolution conversion processing, codec processing, etc.

In the preprocessing, clamping processing to clamp the black level of R, G, and B to a predetermined signal level, correction processing between R, G, and B color channels, and so on are performed on the captured image signal from the imaging unit 13.

In the synchronization processing, color separation processing is performed so that image data on each pixel includes all color components of R, G, and B. For example, for an imaging element using a Bayer array color filter, demosaicing is performed as color separation processing.

In the YC generation processing, a luminance (Y) signal and a color (C) signal are generated (separated) from the image data of R, G, and B.

In the resolution conversion processing, the resolution conversion processing is executed on the image data before being subjected to various types of signal processing or after being subjected to signal processing.

In the codec processing in the camera signal processing unit 16, for example, encoding processing for recording and communication and file generation are performed on the image data that has been subjected to the above various types of processing. For example, an image file MF is generated in the MP4 format or the like used in the recording of video and audio compliant with MPEG-4. Further, as a still image file, a file may be generated in a format such as Joint Photographic Experts Group (JPEG), Tagged Image File Format (TIFF), or Graphics Interchange Format (GIF).

Note that the camera signal processing unit 16 performs processing to add metadata transmitted from the camera control unit 21 to the image file.

The metadata includes parameters of the various types of processing in the camera signal processing unit 16 and detection information obtained by the sensor unit 24 described later, and is added, for example, to each corresponding frame constituting a video, to the entire corresponding video, or to a corresponding predetermined single such as a scene unit.

In the present embodiment, the camera control unit (the imaging control apparatus 22) performs control suited to the recognition of the product introduction scene and the performance scene as described later. It is assumed that metadata related to that is also generated and added to the image file.

Specifically, information indicating whether each frame is the product introduction scene or the performance scene, information indicating whether the scene is successfully recognized or unrecognized, information on whether or not the object to be introduced and the object introducer are identified, information indicating the regions of the object to be introduced and the object introducer identified in the image, an error flag (described later with reference to FIG. 18 etc.), and so on may be added as the metadata.

Note that although described here is an example in which the camera signal processing unit 16 performs metadata addition processing, an example in which the recording control unit 17 or the output unit 19 performs the metadata addition processing is also possible.

Although an audio processing system is not illustrated in FIG. 2, an audio recording system and an audio processing system are actually included. The image file may include audio data together with the image data as the video.

In a case where audio recording is performed, an audio signal input from an audio input unit such as a microphone (not illustrated) is converted into a digital audio signal in the audio processing system and then sent to the camera control unit 21. The camera control unit 21 performs control to record the digital audio signal in a recording medium such as a nonvolatile memory in association with the image signal.

The recording control unit 17 performs recording and reproduction on the recording medium such as a nonvolatile memory. The recording control unit 17 performs, for example, processing to record an image file of moving image data, still image data, or the like, a thumbnail image, etc. on the recording medium.

Note that the recording control unit 17 may be provided in the imaging control apparatus 22.

The recording control unit 17 can be in various actual forms. For example, the recording control unit 17 may be configured as a flash memory and its write and read circuit built in the imaging device 1, or may be in the form of a card recording and reproducing unit that performs recording and reproducing access to a recording medium that is removably fitted into the imaging device 1, for example, a memory card (such as a portable flash memory). Furthermore, it may be implemented as a hard disk drive (HDD) or the like as a form of being incorporated in the imaging device 1.

The presentation unit 18 includes a display unit that performs various displays for a person shooting. The display unit is, for example, a display panel or a viewfinder of a display device such as a liquid crystal display (LCD) or an organic electroluminescent (EL) display disposed in a housing of the imaging device 1.

The presentation unit 18 also includes an audio output unit such as a speaker. A digital audio signal read by the camera control unit 21 is converted into an audio signal by the camera signal processing unit 16 and then output by the audio output unit.

The display unit in the presentation unit 18 performs various displays on a display screen on the basis of instructions from the camera control unit 21. For example, captured image data whose resolution has been converted for display by the camera signal processing unit 16 is supplied. In response to an instruction from the camera control unit 21, the display unit performs display on the basis of the captured image data. Consequently, so-called through images (subject monitoring images), which are captured images during standby or recording, are displayed.

Furthermore, the display unit displays reproduction images of the captured image data read from the recording medium in the recording control unit 17.

The display unit displays various operation menus, icons, messages, etc., that is, performs display as a graphical user interface (GUI) on the screen on the basis of instructions from the camera control unit 21.

The output unit 19 performs data communication and network communication with external devices by wire or radio.

For example, captured image data (a still image file or a moving image file) is transmitted and output to a display device, a recording device, a reproduction device, etc. outside.

Further, as a network communication unit, the output unit 19 may perform communication via various networks such as the Internet, a home network, and a local area network (LAN) to transmit and receive various data to and from a server, a terminal, etc. on the networks.

The operating unit 20 collectively indicates input devices for the user to perform various operation inputs. Specifically, the operating unit 20 indicates various operation elements (such as keys, a dial, a touch panel, and a touch pad) provided at the housing of the imaging device 1.

The operation of the user is detected by the operating unit 20, and a signal corresponding to the input operation is sent to the camera control unit 21.

The camera control unit 21 is constituted by a microcomputer (an arithmetic processing unit) including a central processing unit (CPU).

The memory unit 23 stores information etc. used in processing by the camera control unit 21. The memory unit 23 illustrated in the figure comprehensively indicates, for example, a read-only memory (ROM), a random-access memory (RAM), a flash memory, etc.

The memory unit 23 may be a memory area built in a microcomputer chip as the camera control unit 21, or may be constituted by a separate memory chip.

The camera control unit 21 executes a program stored in the ROM, the flash memory, or the like of the memory unit 23 to control the entire imaging device 1.

For example, the camera control unit 21 controls the operation of the units necessary for the control of the shutter speed of the imaging unit 13, the instruction of various types of signal processing in the camera signal processing unit 16, the acquisition of lens information, imaging operation and recording operation according to the operation of the user, the start and end control of video recording, the operation of reproducing a recorded image file, camera operation such as zooming, focusing, and exposure adjustment in the lens barrel, user interface operation, etc.

The RAM in the memory unit 23 is used for the temporary storage of data, programs, etc. as a workspace during various types of data processing by the CPU of the camera control unit 21.

The ROM and the flash memory (nonvolatile memory) in the memory unit 23 are used for the storage of an operating system (OS) for the CPU to control each unit, content files such as image files, application programs for various operations, firmware, etc.

The camera control unit 21 has functions as the imaging control apparatus 22. The imaging control apparatus 22 is assumed to have functions as, for example, an identification unit 22a, a selection unit 22b, an imaging control unit 22c, a presentation control unit 22d, and an association control unit 22e. These functions are implemented by software (an application program) in the camera control unit 21 as a microcomputer or the like.

The identification unit 22a performs processing to identify a product and an object introducer who introduces the object to be introduced that are subjects on the basis of the inside of captured image data obtained by the imaging unit 13 of the imaging device 1. For example, the identification unit 22a identifies the product and the face of the object introducer by performing analysis processing on the acquired captured image data.

The identification of the product referred to here includes not only the selection of the product to be introduced from products detected from subjects appearing in the captured image data, but also the estimation of the position of the product from, for example, the position or state of a hand of the object introducer or the like.

The selection unit 22b selects one of the product and the object introducer as the target subject on the basis of, for example, the positional relationship between any two of the product to be introduced, the object introducer, and the imaging device 1. More specifically, for the selection of the target subject, the selection unit 22b performs scene determination, that is, determination on whether the scene of a video being currently shot is the performance scene or the product introduction scene, and selects one of the product and the object introducer as the target subject according to the determined scene.

In the present disclosure, the positional relationship between the product, the object introducer, and the imaging device 1 is referred to as a subject positional relationship. The subject positional relationship is determined on the basis of, for example, the distance between the imaging device 1 and the product, the distance between the product and the object introducer, the distance between the imaging device 1 and the object introducer, or the like.

Note that the distance may not be the distance itself. A value correlated with the distance may be used. For example, the ratio of the region of the product or the object introducer to the entire frame of the captured image may be used as a value corresponding to the distance. Further, information on the position of the focus lens or the like may be used as information corresponding to the distance.

The imaging control unit 22c performs imaging control suitable for the region of a subject selected as the target subject by the selection unit 22b. For example, the imaging control unit 22c performs imaging operation control such as autofocus control and captured image processing control such as white balance processing control suitable for the region of the target subject.

In a case where the distance between the imaging device 1 and the product is shorter than a predetermined value, the presentation control unit 22d performs presentation control to present, to the object introducer, a difficult control state in which the imaging control is difficult. For example, depending on conditions, the presentation control unit 22d may control the execution of the output of a message, an icon, or the like on the display unit, the lighting or blinking of a warning light, or the like in the presentation unit 18.

The association control unit 22e performs association control to associate metadata related to the result of selection by the selection unit 22b with the captured image data.

The metadata related to the result of the selection by the selection unit 22b may be, for example, information indicating whether it is the product introduction scene or the performance scene, information indicating whether the scene is successfully recognized or unrecognized, information on whether or not the object to be introduced and the object introducer are identified, information indicating the regions of the object to be introduced and the object introducer identified in the image, information on the target subject (information on which is selected, the object introducer 60 or the product 70), information on what the object to be introduced or the target subject is (such as the type of an article), an error flag indicating a determination impossible state (described later with reference to FIG. 18 etc.), and so on.

For example, the association control unit 22e transmits such metadata related to the result of selection by the selection unit 22b to the camera signal processing unit 16, so that the metadata related to the result of the selection by the selection unit 22b is included in the image file in the camera signal processing unit 16.

That is, the association control unit 22e provides the information, for example, on a frame-by-frame basis to the camera signal processing unit 16, according to the results of scene determination and target subject selection by the selection unit 22b.

The association control unit 22e provides the metadata in this manner to cause the camera signal processing unit 16 to execute processing to add the metadata to the image file, so that the metadata related to the result of the selection by the selection unit 22b is recorded in the same recording medium as the captured image data or put in the same file to be recorded and transmitted, for example. Of course, configured as a metadata file separate from the image file, each piece of metadata may be associated with the image file and the frame of the captured image data in the image file.

As a result, the metadata related to the result of the selection by the selection unit 22b, for example, the metadata indicating the product introduction scene or the performance scene is associated with the captured image data on a frame-by-frame basis.

Note that the metadata related to the result of the selection by the selection unit 22b may be associated with the captured image data on a scene-by-scene basis, for example, instead of being associated with the frame.

The sensor unit 24 comprehensively indicates various sensors mounted on the imaging device 1. As the sensor unit 24, for example, a position information sensor, an illuminance sensor, an acceleration sensor, etc. are mounted.

Processing to implement the present technology is performed by the digital video camera LA including the imaging control apparatus 22 having the above functions.

Meanwhile, control processing by the imaging control apparatus 22 as described later can be implemented not only in the digital video camera 1A but also in the mobile terminal 1C such as a smartphone illustrated in FIG. 1. Thus, a configuration example of the mobile terminal 1C will also be described.

Figure 3:
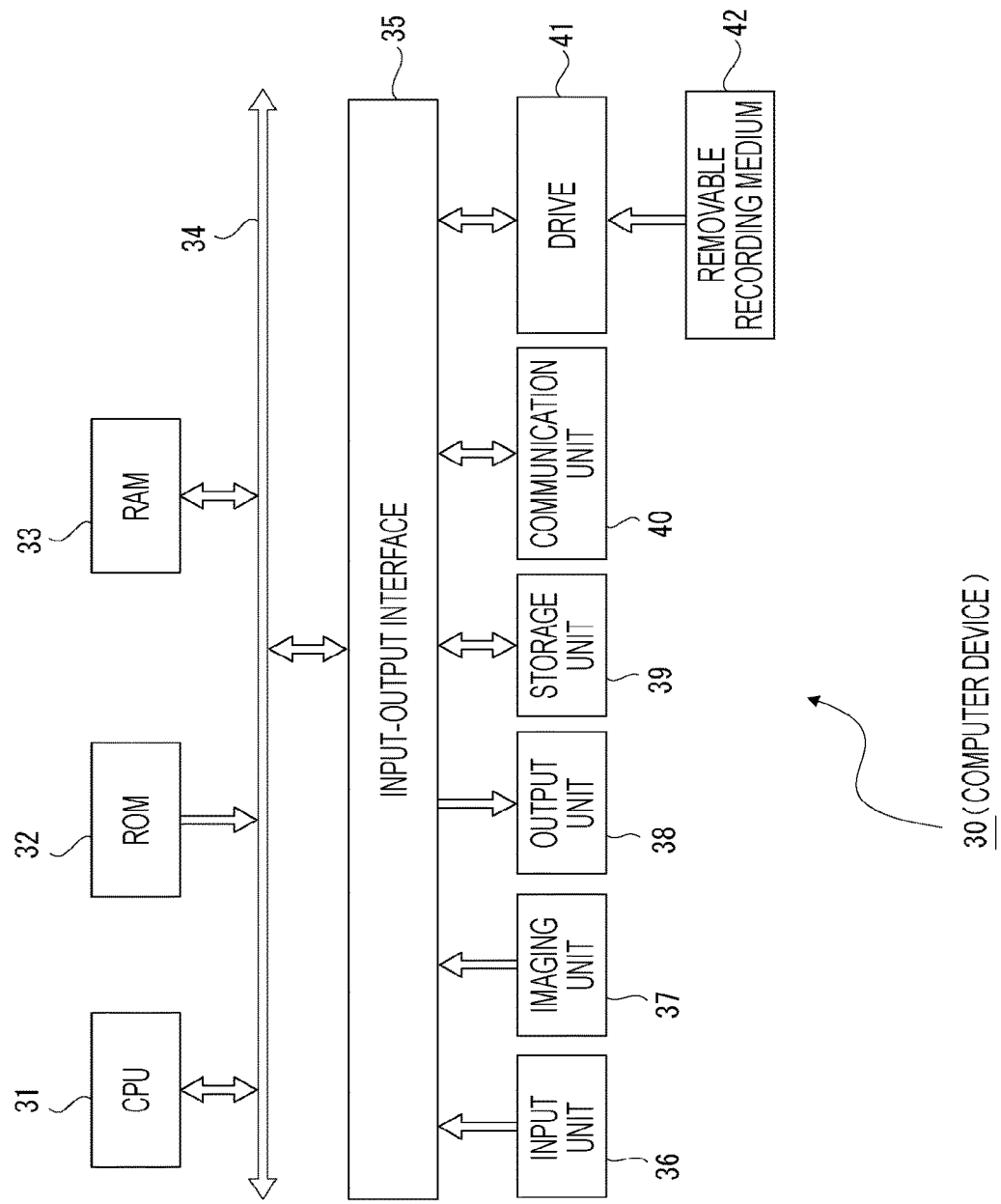
FIG. 3 is a block diagram of a computer device according to the embodiments.

The mobile terminal 1C can be provided as, for example, a computer device 30 having a configuration illustrated in FIG. 3.

In FIG. 3, a central processing unit (CPU) 31 of the computer device 30 executes various types of processing according to a program stored in read-only memory (ROM) 32 or a program loaded from a storage unit 39 into random-access memory (RAM) 33. In the RAM 33, data etc. necessary for the CPU 31 to execute the various types of processing are also stored as appropriate. The CPU 31 is provided with a functional configuration as the above-described imaging control apparatus 22 by, for example, an application program.

The CPU 31, the ROM 32, and the RAM 33 are interconnected via a bus 34. An input-output interface 35 is also connected to the bus 34.

An input unit 36, an imaging unit 37, an output unit 38, the storage unit 39, and a communication unit 40 are connected to the input-output interface 35.

The input unit 36 includes a keyboard, a mouse, a touch panel, etc.

The imaging unit 37 includes a lens system including an imaging lens, a diaphragm, a zoom lens, a focus lens, etc., a drive system for causing the lens system to perform focus operation and zoom operation, a solid-state imaging element array that detects captured image light obtained by the lens system and generates a captured image signal by performing photoelectric conversion, and others.

The output unit 38 includes a display such as a liquid crystal display (LCD), a cathode-ray tube (CRT), or an organic electroluminescence (EL) panel, a speaker, etc.

For example, the output unit 38 performs the display of images for various types of image processing, moving images to be processed, etc. on a display screen on the basis of instructions from the CPU 31. Further, the output unit 38 displays various operation menus, icons, messages, etc., that is, performs display as a graphical user interface (GUI) on the basis of instructions from the CPU 31.

The storage unit 39 includes a hard disk drive (HDD), a solid-state memory, etc. and stores various types of information.

The communication unit 40 performs communication processing via a transmission line such as the Internet, and performs communication with various devices by wired/wireless communication, bus communication, etc.

To the input-output interface 35, a drive 41 is also connected as necessary, into which a removable recording medium 42 such as a magnetic disk, an optical disk, a magneto-optical disk, or a semiconductor memory is fitted as appropriate.

The drive 41 allows data files such as image files, various computer programs, etc. to be read from the removable recording medium 42. A data file read is stored in the storage unit 39, and video and audio included in the data file are output by the output unit 38. Furthermore, a computer program or the like read from the removable recording medium 42 is installed in the storage unit 39 as necessary.

The computer device 30 allows, for example, software for executing processing as the imaging control apparatus of the present disclosure to be installed via network communication by the communication unit 40 or the removable recording medium 42. Alternatively, the software may be stored in advance in the ROM 32, the storage unit 39, or the like.

Note that the computer device 30 is not limited to being configured singly as in FIG. 3, and may be configured by systematizing a plurality of computer devices. The plurality of computer devices may include computer devices as a server group (cloud) usable by a cloud computing service.

3. OUTLINE OF SCENE DETERMINATION

Hereinafter, the outline of scene determination in the present technology will be described. Here, a different type of imaging control is performed on imaging by the imaging device 1 depending on each scene. In the present embodiment, switching of a focus control target will be mainly described as an example of the imaging control.

In recent years, the diffusion of video posting sites and SNSs allows individuals to easily post videos they shot, accompanied by an increase in the number of posters of product review videos to introduce products by videos shot by individuals.

In many cases, such product review videos mainly include a performance scene for the purpose of imaging the performance of an object introducer, such as the self-introduction of the object introducer and the outlining of a product, which is often performed before or after a product introduction scene, and the product introduction scene for the purpose of imaging the shape and operation of the product, the manner in which the product is actually used, and the like.

In the performance scene, it is desirable to perform focus control on an object introducer who introduces a product. In the product introduction scene for explaining a specific product, it is desirable to perform focus control on the product so that the shape etc. of the product can be easily seen.

However, in a case where an individual shoots a product review video, an object introducer who introduces a product often performs an operation to shoot the video by himself or herself, that is, takes selfies, and the shooting is performed with the imaging device 1 stationary. Therefore, it has been difficult for an object introducer to switch the focus control target by performing an operation to change the focus control target depending on an imaged scene during shooting.

Furthermore, an object introducer and others appear in addition to a product in actual video shooting, so that the imaging device 1 side cannot recognize which is the product to be introduced, resulting in the problem that focus control to focus on the product that should be the target of focus control is not performed in the product introduction scene.

Therefore, in the present technology, it is determined which scene a captured image being captured is, the performance scene or the product introduction scene, a subject suitable for each scene is identified, and then imaging control such as focus control is performed.

An outline of specific focus control will be described with reference to FIGS. 4 to 13.

FIGS. 4 and 5 and FIGS. 6 and 7 illustrate the distance relationship between an object to be introduced, an object introducer, and an imaging device.

Furthermore, FIGS. 8 to 13 illustrate a captured image display screen 50 displayed as a through image on the display unit in the shooting of a product review video. An object introducer 60 who introduces a product 70 and the product 70 to be introduced are displayed on the captured image display screen 50. The object introducer 60 has a hand 61 and a face 62 as parts of the body.

In addition, in FIGS. 4 to 13, portions indicating the hand 61, the face 62, and the product 70 are illustrated as regions surrounded by broken lines for explanatory convenience.

First, a first embodiment will be described with reference to FIGS. 4 and 5. In the first embodiment, scene determination is performed according to a distance relationship resulting from a subject positional relationship.

The first embodiment is an example in which a scene is determined on the basis of the distance from the imaging device 1 to the product 70, the target subject appropriate for each scene is selected, and imaging control is performed.

Note that when shooting a product review video, a product introducer is often located in front of the imaging device 1 and performs shooting in a certain position without moving. The present embodiment can be applied to such a case.

A distance Loc from the imaging device 1 to the product 70 can be considered to change depending on the scene. For example, when shooting the product review video, the object introducer 60 may bring the product 70 held in the hand 61 close to the imaging device 1 to explain the product 70 while making it prominent.

Therefore, subject selection based on scene determination is performed on the basis of the positional relationship between the product 70 and the imaging device 1, particularly, a distance relationship represented by the distance Loc.

Note that the product 70 referred to here is an object to be introduced identified by the imaging control apparatus 22. Furthermore, in a case where the product 70 has not been able to be recognized, a case where the hand 61 of the object introducer 60 is identified in place of the product 70 is also included. That is, it is a case where a true object to be introduced is the product 70, but in place of that, the hand 61 of the object introducer 60 is identified as the object to be introduced. This means that, for example, in a case where the product 70 is too small to be identified in the image, a situation where the product 70 is held in the hand 61 is assumed, and the position of the product 70 in the image is identified by regarding the hand as the product 70.

Figure 4:
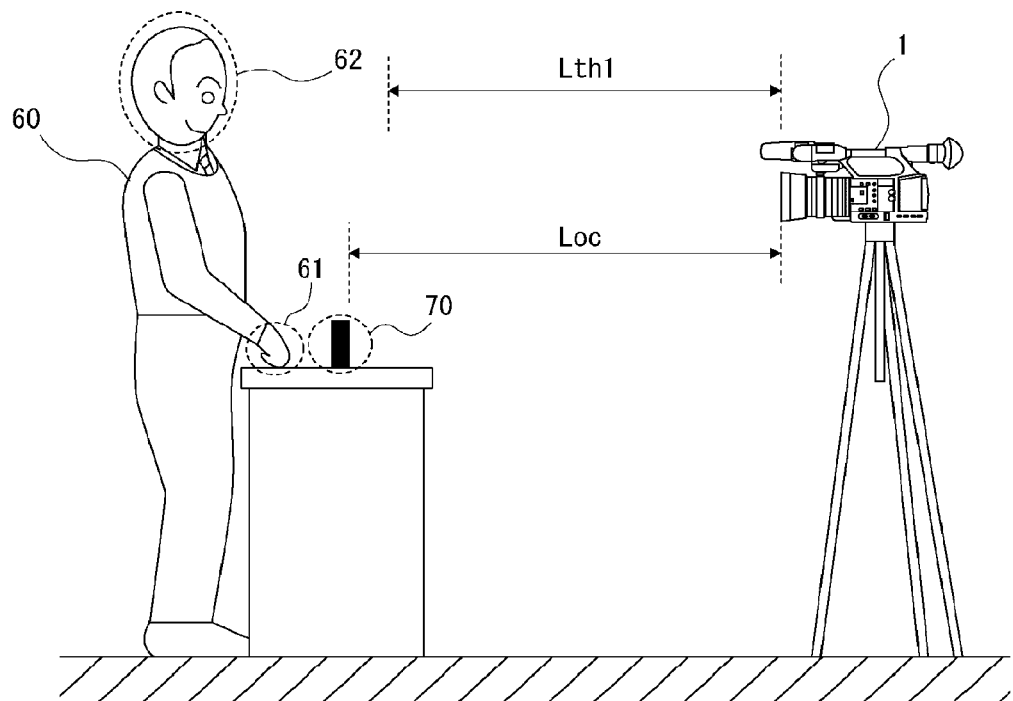
FIG. 4 is a first explanatory diagram of scene determination according to a first embodiment.

FIG. 4 illustrates a case where the value of the distance Loc from the product 70 to the imaging device 1 is a value larger than a predetermined value Lth. This is a state in which the distance from the imaging device 1 to the product 70 is relatively long. Then, this is a state in which the object introducer 60 is not bringing the product 70 close to the imaging device 1 to make the product 70 prominent, and thus is considered to be the performance scene in which the object introducer 60 gives a performance.

Thus, the imaging control apparatus 22 selects the face 62 of the object introducer 60 giving the performance as the target subject, and performs focus control targeted at the face 62. This allows video shooting to make viewers pay attention to the object introducer 60 speaking in the performance scene.

Note that although focus control is performed with the face 62 of the object introducer 60 as the target subject, focus control may be performed with, for example, the eyes of the object introducer 60 as the target subject.

Figure 5:
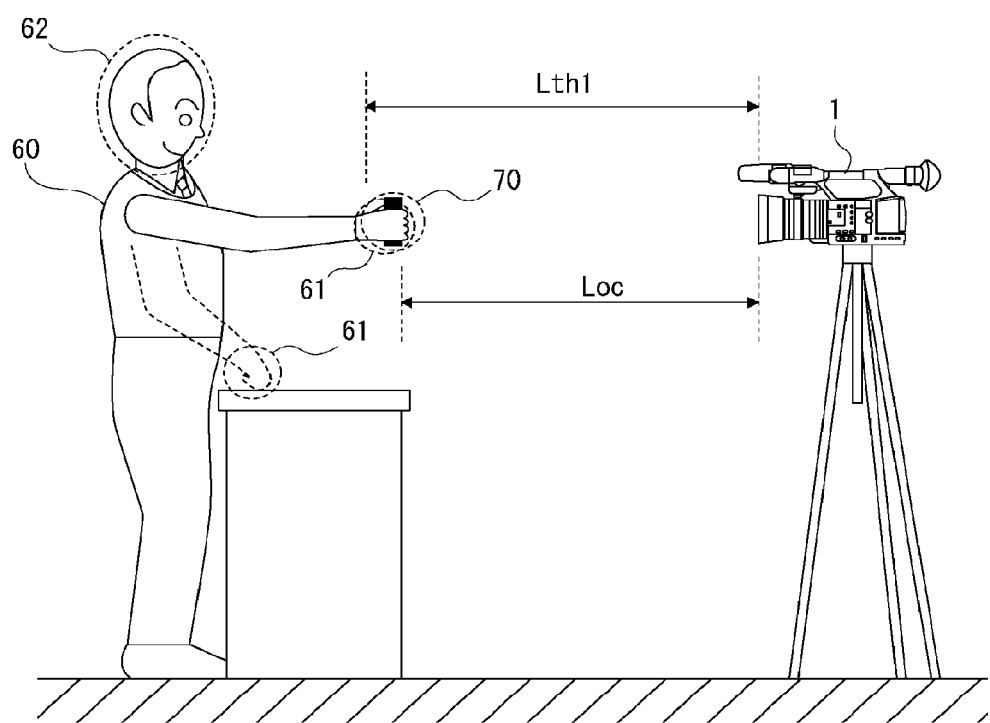
FIG. 5 is a second explanatory diagram of scene determination according to the first embodiment.

On the other hand, in a case where the value of the distance Loc from the product 70 to the imaging device 1 is a value smaller than the predetermined value Lth1 as in FIG. 5, it can be estimated that the object introducer 60 is in a state of bringing the product 70 close to the imaging device 1, and it is considered to be the product introduction scene in which the object introducer 60 is introducing the product 70.

In the product introduction scene like this, the imaging control apparatus 22 selects the product 70 as the target subject and performs focus control targeted at the product 70. Consequently, focus control to focus on the product 70 that the object introducer 60 is about to introduce is performed, allowing video shooting to make viewers pay attention to the product 70.

As described above, in the first embodiment, a scene is determined on the basis of the distance from the imaging device 1 to the product 70, and focus control to focus on the target subject appropriate for each scene is performed.

A second embodiment will be described with reference to FIGS. 6 and 7. The second embodiment also performs scene determination according to a distance relationship resulting from a subject positional relationship, but the second embodiment is an example in which a scene is determined on the basis of the distance between the object introducer 60 and the product 70, the target subject appropriate for each scene is selected, and imaging control is performed.

As in FIGS. 4 and 5 described above, it is assumed that, for example, when shooting the product review video, the object introducer 60 brings the product 70 held in the hand 61 close to the imaging device 1 to explain the product 70 while making it prominent. This can also be regarded as a change in a distance Lho illustrated in FIGS. 6 and 7. That is, it can be considered that the distance Lho between the object introducer 60 and the product 70 changes depending on the scene.

Thus, subject selection based on scene determination is performed on the basis of the positional relationship between the object introducer 60 and the product 70, particularly, a distance relationship represented by the distance Lho.

Figure 6:
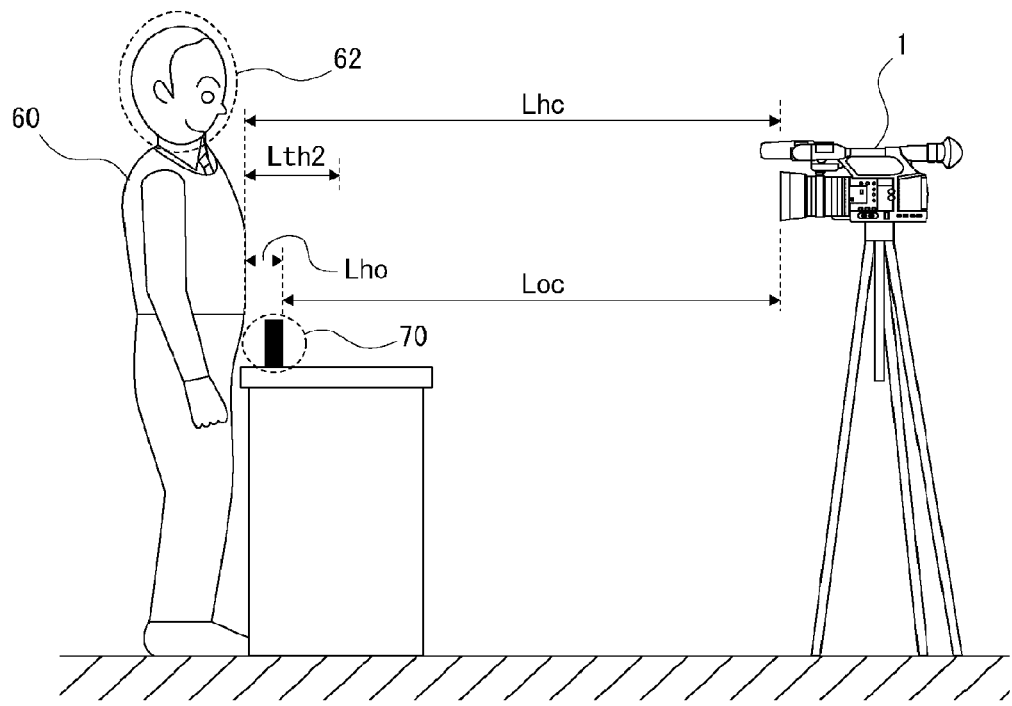
FIG. 6 is a first explanatory diagram of scene determination according to a second embodiment.

FIG. 6 illustrates a case where the distance Lho is relatively small.

In the imaging device 1, a distance Lhc from the imaging device 1 to the object introducer 60 and the distance Loc from the imaging device 1 to the product 70 can be measured, and thus the distance Lho between the object introducer 60 and the product 70 can be determined (Lho=Lhc−Loc).

In the case of FIG. 6, a case where the distance Lho is a value smaller than a predetermined value Lth2 is illustrated. This is a state in which the distance from the object introducer 60 to the product 70 is relatively short.

Then, this is a state in which the object introducer 60 is not bringing the product 70 close to the imaging device 1 to make it prominent, and thus is considered to be the performance scene in which the object introducer 60 gives a performance.

Thus, the imaging control apparatus 22 selects the face 62 of the object introducer 60 giving the performance as the target subject, and performs focus control targeted at the face 62 (or eyes etc.). This allows video shooting to make viewers pay attention to the object introducer 60 speaking in the performance scene.

Figure 7:
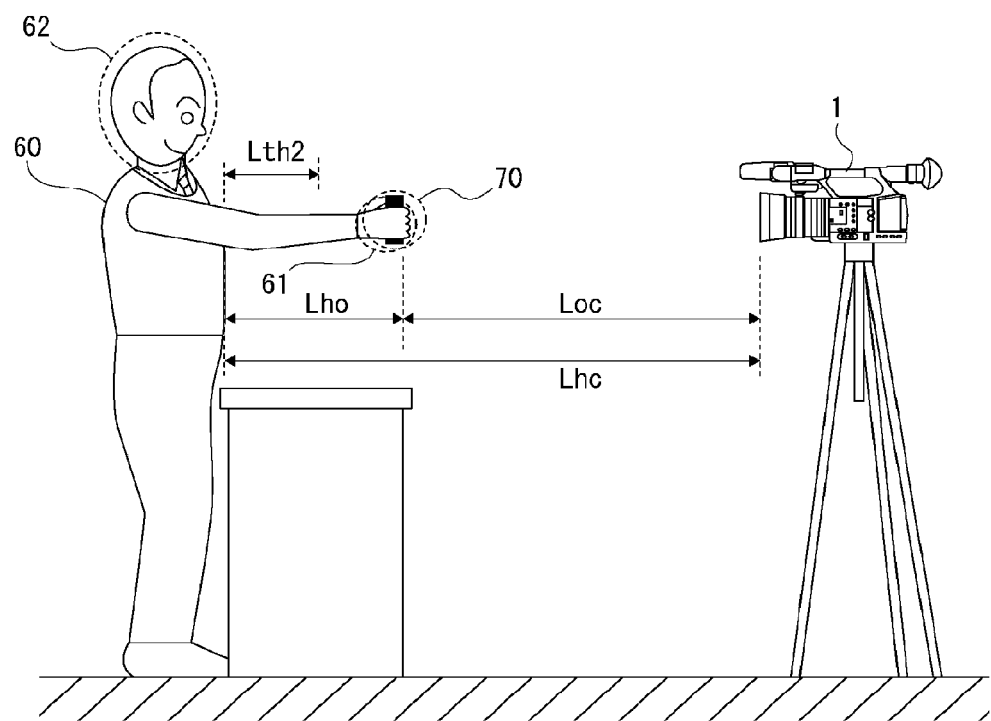
FIG. 7 is a second explanatory diagram of scene determination according to the second embodiment.

On the other hand, FIG. 7 illustrates a case where the distance Lho is a value larger than the predetermined value Lth2. This is a state in which the distance from the object introducer 60 to the product 70 has become relatively long.

Then, this is a state in which the object introducer 60 is bringing the product 70 close to the imaging device 1 to make it prominent, and thus is considered to be the product introduction scene in which the object introducer 60 is introducing the product 70.

In the product introduction scene like this, the imaging control apparatus 22 selects the product 70 as the target subject and performs focus control targeted at the product 70. Consequently, focus control to focus on the product 70 that the object introducer 60 is about to introduce is performed, allowing video shooting to make viewers pay attention to the product 70.

As described above, in the second embodiment, a scene is determined on the basis of the distance from the object introducer 60 to the product 70, and focus control appropriate to the target subject appropriate for each scene is performed.

This second embodiment and the first embodiment both perform scene determination on the basis of a distance relationship. However, in a case where determination is performed using solely the distance Lho between the object introducer 60 and the product 70 as in the second embodiment, there arises an advantage that the determination can be performed regardless of the movement (position) of the object introducer 60.

That is, in scene determination in the first embodiment, it is required that the object introducer 60 not move (maintain the same distance) with respect to the imaging device 1. In a case where the object introducer 60 moves back and forth with the product 70 in the hand, scene determination can be inaccurate.

On the other hand, in the case of the second embodiment, the determination is performed with attention paid solely to the distance Lho between the object introducer 60 and the product 70, so that the accuracy of scene determination can be maintained even in a case where the object introducer 60 moves back and forth.

By the way, the above is an example in which attention is paid to the distance Lho, and the distance Lho is compared with the predetermined value Lth2. However, scene determination may be performed with attention paid to a change in a difference value between the distance Lho and the distance Loc. That is, the performance scene and the product introduction scene are determined on the basis of whether the difference (or ratio) between the distance Lho and the distance Loc is greater than or equal to, or less than a predetermined value.

Further, in the above examples, the behavior of bringing the product 70 close to the imaging device 1 is assumed in the product introduction scene, but it may sometimes be better to assume the opposite behavior.

That is, the object introducer 60 may take on the behavior of keeping the product 70 away from him or her in the performance scene, and bringing the product 70 close to the object introducer 60 by, for example, holding it in hand in the product introduction scene.

To cope with such behavior, the logic of scene determination may be reversed. For example, if the distance Lho is longer than the predetermined value Lth2, it is considered to be the performance scene, and if the distance Lho is less than or equal to the predetermined value Lth2, it is considered to be the product introduction scene.

For example, the user may be allowed to select which scene determination logic to use.

Further, for each distance, attention has been paid to the distance (depth) in the depth direction from the imaging device 1, but the distance between the object introducer 60 and the product in the vertical or horizontal direction may be taken into account.

A third embodiment will be described with reference to FIGS. 8 to 11. The third embodiment is an example in which on the basis of the state of the hand 61 of the object introducer 60, particularly, the relationship between the hand 61 and the product 70, the product 70 is identified, and scene determination is performed.

Figure 8:
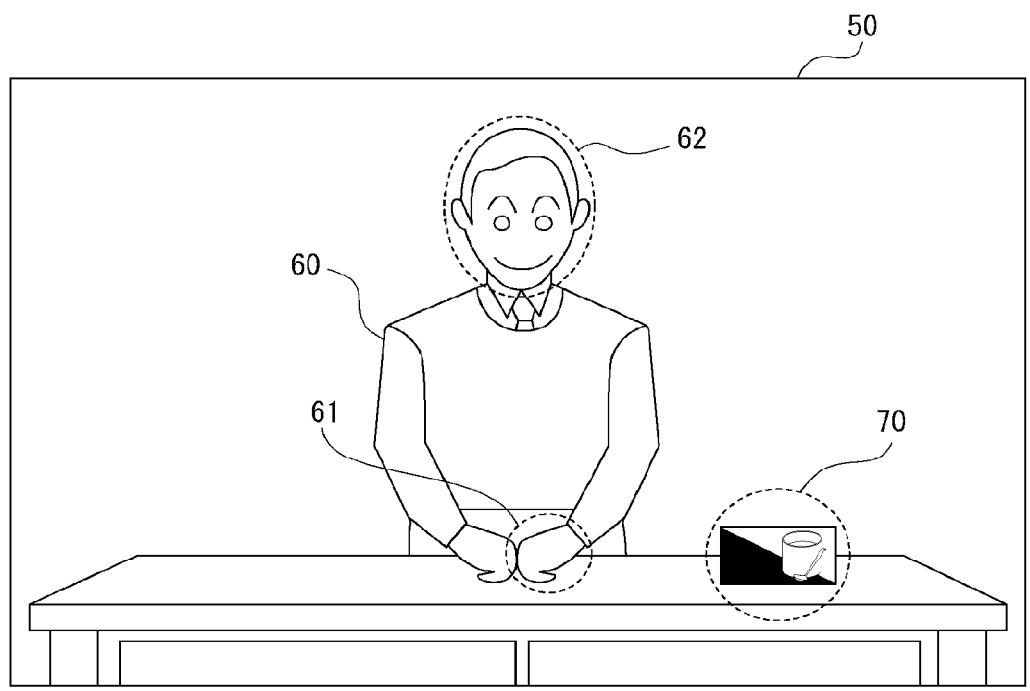
FIG. 8 is a first explanatory diagram of scene determination according to a third embodiment.
Figure 9:
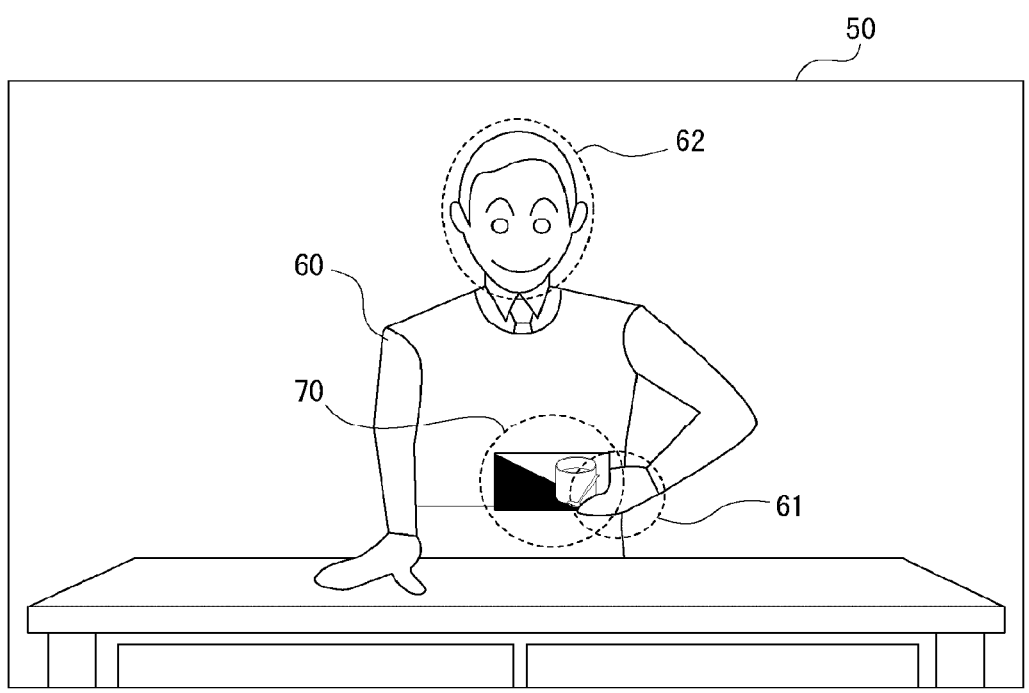
FIG. 9 is a second explanatory diagram of scene determination according to the third embodiment.

FIGS. 8 and 9 illustrate that scene determination is performed using the positional relationship between the object introducer 60 and the product 70 based on the state of the hand 61 of the object introducer 60 such as holding the product 70, and focus control appropriate to the target subject selected depending on each scene is performed.

Here, the state of the hand 61 of the object introducer 60 is not limited to the state of holding the product 70, and includes various states in which the hand 61 is in contact with the product 70, such as pinching, grasping, and placing on the hand the product 70.

In a state in which the object introducer 60 is not holding the product 70 as in FIG. 8, it is considered to be the performance scene in which the object introducer 60 gives a performance.

Thus, focus control is performed with the face 62 of the object introducer 60 as the target subject. This allows video shooting to make viewers pay attention to the object introducer 60 speaking in the performance scene.

On the other hand, in a state in which the object introducer 60 is holding the product 70 as in FIG. 9, the product 70 can be identified, and it is considered to be a scene in which the object introducer 60 specifically introduces the product 70, that is, the product introduction scene.

In the product introduction scene, specific aspects of the product 70 such as the shape of the product 70 will be explained, and thus focus control etc. are performed with the product 70 as the target subject.

Consequently, focus control to focus on the product 70 that the object introducer 60 is about to introduce is performed, allowing video shooting to make viewers pay attention to the product 70.

As described above, in the third embodiment, a scene is determined on the basis of the state of the hand 61 of the object introducer 60 such as holding the product 70, and focus control to focus on the target subject appropriate for each scene is performed.

Furthermore, in the third embodiment, the product 70 may be identified and a scene may be determined on the basis of a gesture of the hand 61 of the object introducer 60 such as pointing at the product 70, to perform imaging control suitable for the target subject selected depending on each scene.

The gesture referred to here is the state of the hand 61 of the object introducer 60, and may be statically detected as a momentary state of the hand 61, or may be dynamically detected as a movement of the hand 61.

Figure 10:
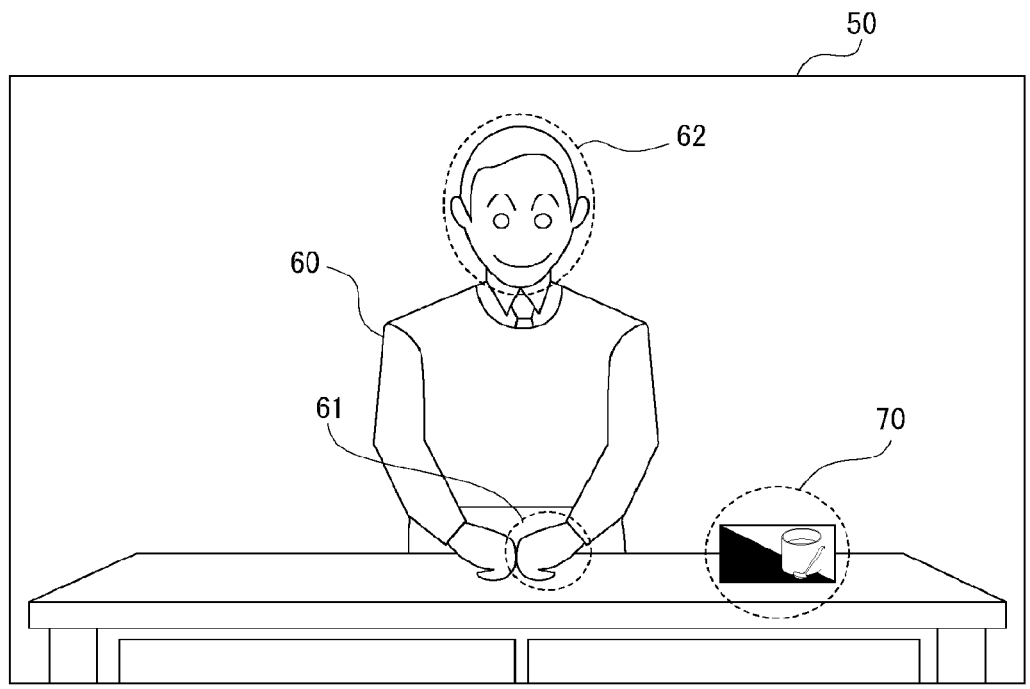
FIG. 10 is a third explanatory diagram of scene determination according to the third embodiment.

In a state in which the object introducer 60 is not making a gesture such as pointing at the product 70 as in FIG. 10, it is considered to be the performance scene in which the object introducer 60 gives a performance.

Thus, imaging control such as focus control is performed with the face 62 of the object introducer 60 as the target subject. This allows video shooting to make viewers pay attention to the object introducer 60 speaking.

Figure 11:
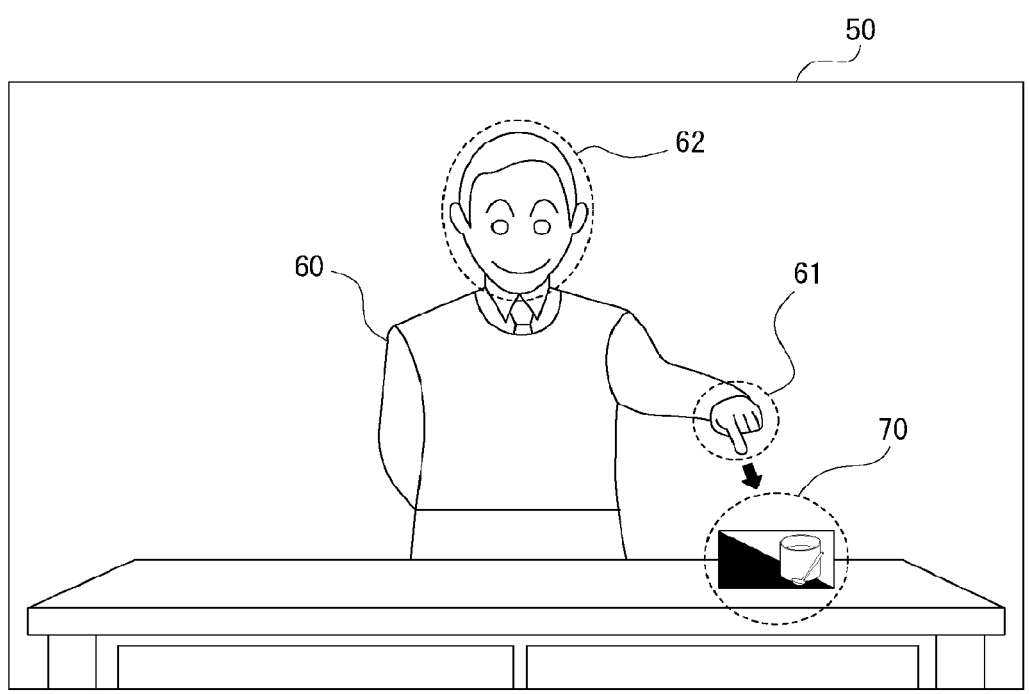
FIG. 11 is a fourth explanatory diagram of scene determination according to the third embodiment.

On the other hand, in a state in which the object introducer 60 is making a gesture such as pointing at the product 70 as in FIG. 11, it is considered to be the product introduction scene in which the object introducer 60 is introducing the product 70.

In the product introduction scene, the identified product 70 is set as the target subject, and focus control to focus on the product 70 is performed. This allows video shooting to make viewers pay attention to the product 70 that the object introducer 60 is about to introduce.

In this example, by performing scene determination on the basis of a gesture of the object introducer 60 such as pointing at the product 70 and performing focus control on the target subject selected depending on each scene, focus control suitable for each scene can be performed.

The relative positional relationship between the target subject 60 and the product 70 is defined from the state of the hand 61 pointing at the product 70 by a gesture. Thus, subject selection based on scene determination can be said to be performed on the basis of the subject positional relationship between the product 70 and the object introducer 60.

This example is suitable for, for example, a case where the product 70 cannot be held with the hand 61, a case where the object introducer 60 introduces the product 70 at a distant position, and the like.

Note that in the above description, the identification of the product 70 to be introduced and scene determination are performed on the basis of the object introducer 60 holding or pointing at the product 70. There may be a case where the product 70 has already been identified in the image, and there may be a case where the product 70 can be identified only on the basis of the state of the hand, and either of them is possible.

For example, even if the product 70 has not been identified, by recognizing a state in which the object introducer 60 holds or points at a certain object, the product 70 can be identified and scene determination can be performed.

Furthermore, in a state in which the product 70 has been identified, by recognizing a state in which the object introducer 60 holds or points at the product 70, scene determination can be performed.

A fourth embodiment will be described with reference to FIGS. 12 and 13. The fourth embodiment is an example in which a scene is determined on the basis of the ratio of the region of the product 70 to the entire frame of the captured image resulting from the subject positional relationship, and focus control is performed on the target subject appropriate for each scene.

Figure 12:
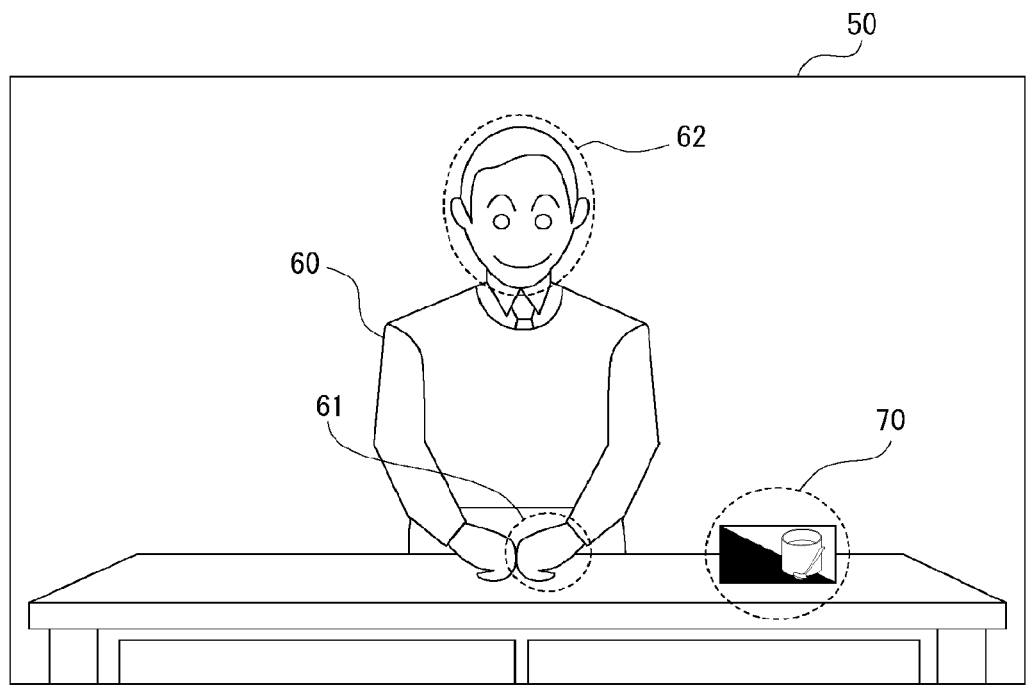
FIG. 12 is a first explanatory diagram of scene determination according to a fourth embodiment.

In a state in which the object introducer 60 is not bringing the product 70 close to the imaging device 1 as in FIG. 12, the ratio of the product 70 to the captured image display screen 50 is not large. Therefore, it is considered to be the performance scene that is not a state in which the object introducer 60 is introducing the product 70.

Thus, it is determined to be the performance scene on the basis of the fact that the ratio of the product 70 to the captured image display screen 50 is smaller than a predetermined value, and focus control is performed with, for example, the face 62 of the object introducer 60 as the target subject. This allows video shooting to make viewers pay attention to the object introducer 60 speaking.

Figure 13:
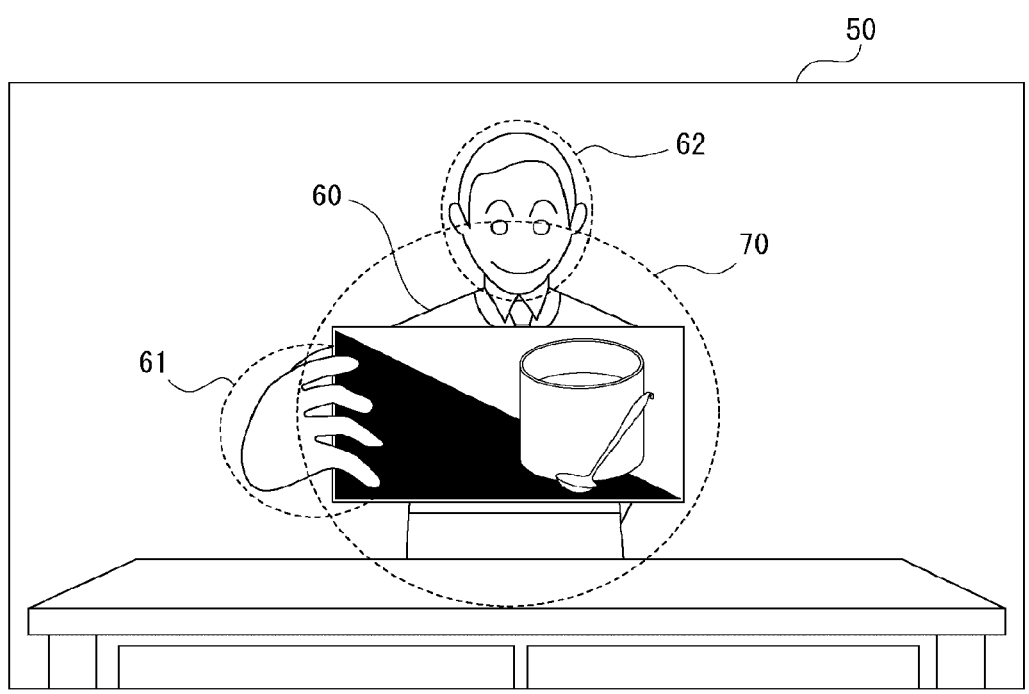
FIG. 13 is a second explanatory diagram of scene determination according to the fourth embodiment.

On the other hand, in a case where the object introducer 60 brings the product 70 close to the imaging device 1 by, for example, holding the product 70 in hand as in FIG. 13, the ratio of the product 70 to the captured image display screen 50 becomes large. In this case, it is assumed that the object introducer 60 is about to explain the product 70.

Thus, it is determined to be the product introduction scene on the basis of the fact that the ratio of the product 70 to the captured image display screen 50 becomes larger than the predetermined value, and focus control is performed with the product 70 as the target subject. This allows video shooting to make viewers pay attention to the product 70.

As described above, in the fourth embodiment, a scene is determined on the basis of the ratio of the area of the product 70 to the area of the captured image to allow imaging control such as focus control suitable for the target subject appropriate for each scene.

A change in the ratio of the area of the product 70 to the entire frame of the captured image occurs with a change in the distance between the product 70 and the imaging device 1, that is, a change in the positional relationship between the imaging device 1 and the product 70. Thus, the subject selection based on scene determination can be said to be performed on the basis of the subject positional relationship between the imaging device 1 and the product 70. Note that in this case, it may be regarded as a change in the subject positional relationship between the object introducer 60 and the product 70.

As described above, scene determination and imaging control suitable for each scene in the present technology can be done in various modes.

4. PROCESSING TO IMPLEMENT EMBODIMENTS

Processing of the imaging control apparatus performed to implement the imaging control in the above embodiments will be described with reference to FIGS. 14 to 21.

First, an overall processing procedure in each embodiment will be described with reference to FIG. 14.

In each embodiment, the imaging control apparatus 22 of the imaging device 1 identifies the product 70 to be introduced and the object introducer 60 in the captured image data, and performs scene determination on the basis of the subject positional relationship. Then, one of the object to be introduced and the object introducer is selected as the target subject depending on the determined scene, and focus control appropriate to the selected target subject is performed.

That is, the imaging control apparatus 22 selects one of the product 70 and the object introducer 60 as the target subject on the basis of the subject positional relationship detected from the captured image data, and performs imaging control suitable for the selected target subject.

Note that for the shooting mode of the imaging device 1 according to the present embodiment, an introduction video mode is provided in which focus control is performed on the target subject selected depending on the determined scene described above. Assume that the imaging control apparatus 22 executes the processing in FIG. 14 in a case where recording of a video is started with the shooting mode set to the introduction video mode.

The introduction video mode is set in response to a mode setting operation of the object introducer 60 on the imaging device 1 before starting the recording of a video, for example.

Figure 14:
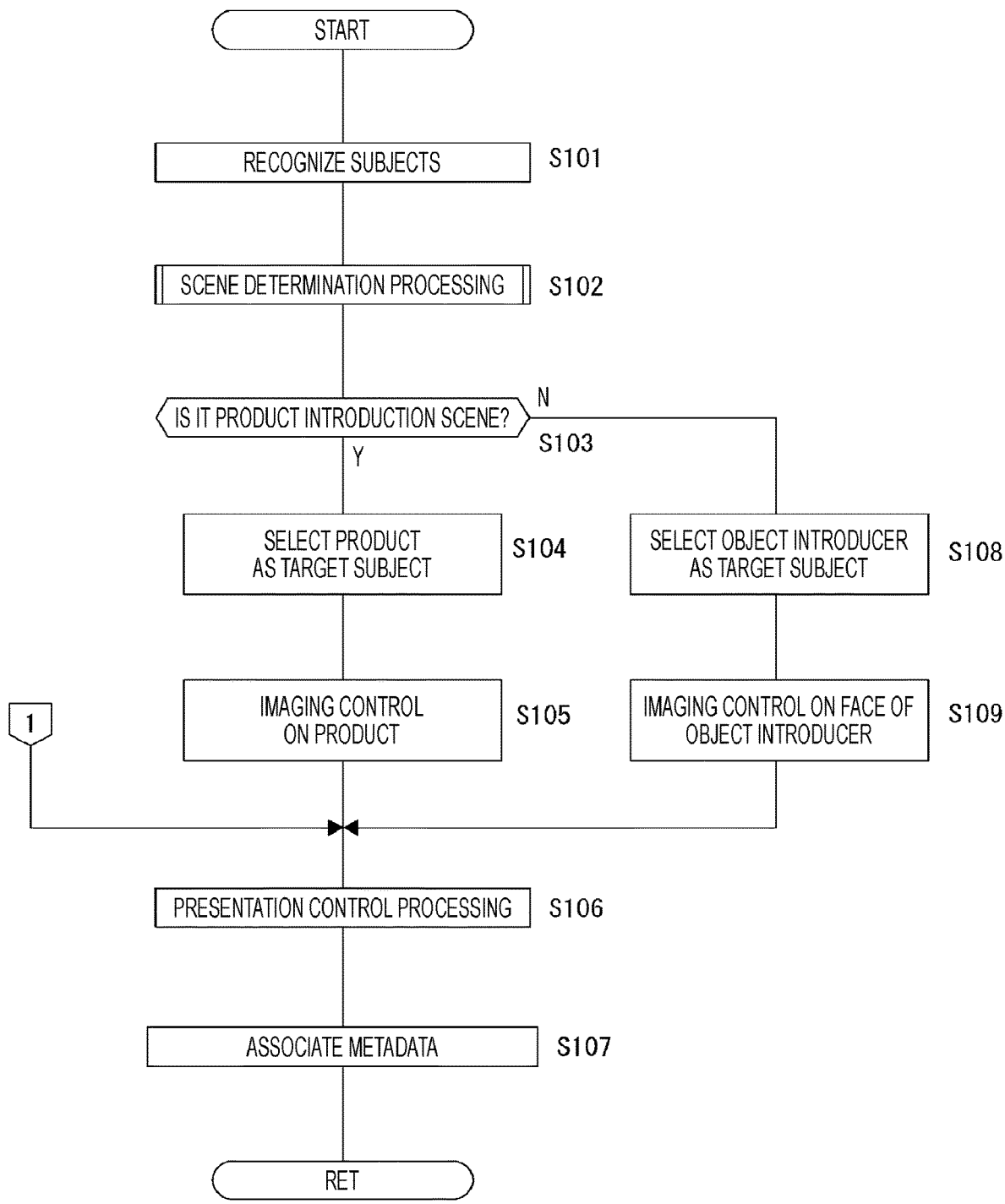
FIG. 14 is a flowchart of a process example according to each embodiment.

The following describes the processing in FIG. 14 executed by the imaging control apparatus 22.

First, the imaging control apparatus 22 recognizes subjects in step S101. The imaging control apparatus 22 acquires a frame of image data or a plurality of frames of image data from the imaging unit 13, and performs image analysis processing or the like using an image signal of the acquired frame(s), to recognize, for example, the hand 61 and the face 62 of the object introducer 60 and the product 70 as illustrated in FIGS. 4 to 13.

Specifically, it is assumed that the imaging control apparatus 22 recognizes the hand 61 and the face 62 of the object introducer 60 by, for example, the estimation of the posture of the object introducer 60 or the extraction of skin color in the image data.

Furthermore, for the product 70 to be introduced, the imaging control apparatus 22 recognizes object portions in the image by shape recognition, pattern recognition, or the like to distinguish them from the object introducer 60, the background, etc. to identify the product 70 to be introduced.

Moreover, for example, the imaging control apparatus 22 may identify the product 70 to be introduced on the basis of the state of the hand 61 recognized. In a case where the imaging control apparatus 22 has recognized a state in which the hand 61 is in contact with the product 70, such as holding, pinching, or grasping the product 70, it identifies the product 70 in contact with the hand 61 as the product 70 to be introduced. Thus, in a state in which various products and others disposed in a shooting place appear, the product 70 touched by the hand 61 can be identified as the product 70 to be introduced in the product review video. That is, the product to be introduced is identified on the basis of a positional relationship in which the product 70 is in contact with the hand 61.

Furthermore, the imaging control apparatus 22 may recognize a state in which a gesture for the identification of the product 70 is being made with the hand 61 of the object introducer 60, and identify the product 70 to be introduced on the basis of the gesture. For example, in a case where a gesture with the hand 61 pointing at the product 70 is recognized, the product 70 lying on the extension of the direction pointed by the hand 61 can be identified as the product 70 to be introduced. That is, the product to be introduced is identified on the basis of a positional relationship in which the product 70 is located in the direction pointed by the hand 61.

As described above, the imaging control apparatus 22 can identify the product 70 to be introduced on the basis of the positional relationship between the object introducer 60 and the product 70.

Note that the identification of the product 70 to be introduced here includes not only the identification of the object to be introduced from the recognized products 70 but also identification by the estimation of the position of the product 70 to be introduced based on the position of the hand 61 of the object introducer 60.

In this case, the imaging control apparatus 22 identifies the hand 61 of the object introducer 60 to estimate that the product 70 to be introduced is at the position of the hand 61, to identify the position of the product 70 to be introduced. For example, in a case where the product 70 is too small to be recognized on the image, the hand 61 is hypothetically regarded as the product 70 (with the assumption that the product 70 is held in hand), and the hand 61 is recognized in place of the product 70 that is the true object to be introduced, so that the product 70 can be identified.

In this manner, by identifying the product 70 to be introduced from the state of the hand 61 of the object introducer 60 detected by the imaging control apparatus 22, or identifying the hand 61 as a substitute for the product 70 that is the true object to be introduced, the product 70 to be introduced in the product review video can be identified even in a state in which various products and others disposed in the shooting place appear.

Subsequently, in step S102, the imaging control apparatus 22 performs scene determination processing using the results of the recognition of the subjects acquired.

The imaging control apparatus 22 determines whether the current scene is the performance scene or the product introduction scene on the basis of the subject positional relationship between each recognized subject and the imaging device 1. As specific scene determination processing, the examples of the first to fourth embodiments described above are assumed. Scene determination processing examples corresponding to the respective embodiments will be sequentially described later with reference to FIGS. 17 to 21.

In step S103, the imaging control apparatus 22 branches the process according to the result of the scene determination processing.

When it is determined to be the product introduction scene in the scene determination processing, the imaging control apparatus 22 advances the process from step S103 to step S104 and selects the product 70 identified in step S101 as the target subject.

Then, in step S105, the imaging control apparatus 22 executes imaging control suitable for the region of the product 70 that is the target subject. For example, as an example of the imaging control, control is performed such that focus control targeted at the product 70 is performed. Note that the following description uses focus control as an example of the imaging control for explanation.

Thus, the imaging device 1 is in a state of performing imaging focused on the product 70 in the product introduction scene. The imaging control apparatus 22 performs control to present, on the display unit of the imaging device 1, a captured image that has been subjected to focus control in the entire screen (frame) using detection information on the region of the product 70 in the frame.

Note that as the imaging operation control, the imaging control apparatus 22 may also perform aperture control to reduce the F value in accordance with the focus control on the product 70 to narrow depth of field to blur the foreground and the background of the product 70.

On the other hand, when it is determined to be the performance scene in the scene determination processing, the imaging control apparatus 22 advances the process from step S103 to step S108 and selects the object introducer 60 identified in step S101 as the target subject.

Then, in step S109, the imaging control apparatus 22 executes focus control to focus on the face 62 of the object introducer 60 who is the target subject. Consequently, in the performance scene, imaging focused on the face 62 of the object introducer 60 is performed. The imaging control apparatus 22 performs control to present, on the display unit of the imaging device 1, a captured image that has been subjected to focus control in the entire screen (frame) using detection information on the region of the face 62 in the frame.

After the processing in step S105 or step S109 described above, the imaging control apparatus 22 also advances the process to step S106, and performs presentation control to present information indicating what is the scene currently determined or the product 70 subjected to focus control by on-screen display, turning on/off of a specific indication unit such as an LED, a voice, or the like.

For example, the imaging control apparatus 22 may display an icon or a message indicating that it is the product introduction scene or the performance scene.

Furthermore, the imaging control apparatus 22 may superimpose and display a focus frame surrounding a product portion on the captured image to indicate that focus control is being performed on the product 70 if it is the product introduction scene, and may superimpose and display a focus frame surrounding a face portion on the captured image to indicate that focus control is being performed on the face 62 if it is the performance scene.

Then, in step S107, the imaging control apparatus 22 performs metadata association. For example, the imaging control apparatus 22 generates metadata on scene information, an error flag, imaging control parameters, etc. on the current frame.

The scene information is information indicating whether it is the performance scene or the product introduction scene. The error flag is information described later with reference to FIG. 14. The imaging control parameters are parameters related to the imaging operation control and the captured image processing control described above.

Then, the imaging control apparatus 22 transmits the generated metadata to the camera signal processing unit 16 as metadata for the current frame so that the metadata is associated with the captured image data. Thereafter, the imaging control apparatus 22 returns to step S101 to execute the processing.

Note that the metadata is associated with the captured image data by, for example, being incorporated into the image file in association with the corresponding frame by the processing of the camera signal processing unit 16, but is not limited thereto. For example, a metadata file in which an ID associated with the captured image data (image file) and the corresponding frame are indicated may be formed separately from the captured image data, to be recorded or transmitted. In any form, it is only required that the captured image data and the metadata can be associated with each other at a later point in time.

Furthermore, although video recording processing is not illustrated in FIG. 12, during a period in which the process in FIG. 12 is being executed, the camera signal processing unit 16 executes processing for video recording on each frame obtained from the imaging unit 13. The metadata generated by the imaging control apparatus 22 in step S107 in FIG. 12 is recorded in the recording medium in association with the frame of the captured image data. Consequently, the scene determination information, the parameters of the appropriate imaging control, etc. are associated with the captured image data.

The imaging control apparatus 22 repeatedly executes the process in FIG. 14 until, for example, the object introducer 60 performs an operation to finish the video recording, or the object introducer 60 changes the shooting mode to a mode other than the introduction video mode.

The above process allows focus control to be performed on the target subject appropriate for the scene by the imaging control apparatus 22 in each embodiment.

Thus, by performing imaging with the product 70 to be introduced focused on in the product introduction scene in which the product 70 to be introduced needs attention, and with the object introducer 60 focused on in the performance scene in which the performance of the object introducer 60 needs attention, focus control can be effectively performed on the object that needs the attention of viewers in each scene.

Note that in the present embodiment, as an example, the introduction video mode is set in response to the mode setting operation on the imaging device 1 by the object introducer 60, but the setting of the introduction video mode can be done in various modes.

For example, assume that the digital video camera 1A in FIG. 1 has an imaging device body 2 and a display housing 3 with a display unit, and by moving the display housing 3 with respect to the imaging device body 2, the display unit of the display housing 3 can be turned to the same side as the imaging lens. The imaging device 1 like this can determine that selfie taking is being performed on the basis of that state, and on the basis of this, can set the introduction video mode. That is, when detecting a state in which the display unit of the display housing 3 is turned to the same side as the imaging lens, the imaging control apparatus 22 sets the shooting mode to the introduction video mode.

Note that in the shooting of a product review video, it is common that the object introducer 60 himself or herself shoots the video as illustrated in FIG. 4. Therefore, by allowing the object introducer 60 to recognize the current state of the imaging control through content displayed on the display unit during the recording of the product review video, the object introducer 60 himself or herself can determine reshooting, continuation, or the like of the video during the recording of the product review video.

Furthermore, the present embodiment has described the example in which the imaging control apparatus 22 identifies the product 70 to be introduced on the basis of the state of the hand 61 recognized in the processing of step S101, but the product 70 to be introduced may be identified on the basis of audio data obtained by the audio input unit.

For example, by associating the product 70 with the name in advance, the imaging control apparatus 22 can acquire audio data from a voice collected from the imaging device 1, perform language analysis on the acquired audio data, and identify the product 70 corresponding to the name acquired by the language analysis.

Furthermore, the imaging control apparatus 22 may identify the product 70 to be introduced on the basis of the line-of-sight direction of the object introducer 60.

For example, in step S101, the imaging control apparatus 22 may recognize the line-of-sight direction of the object introducer 60 by performing image analysis processing using frame information acquired, and identify the product 70 lying on the extension of the recognized line-of-sight direction as the product 70 to be introduced.

Furthermore, before the start of recording of the product review video in the introduction video mode, the product 70 to be introduced may be registered through an operation of the object introducer 60. For example, the imaging control apparatus 22 recognizes products 70 from the captured image data and displays the recognized products 70 on the display unit. The object introducer 60 performs an operation to select the product 70 to be introduced from the displayed products 70. The imaging control apparatus 22 registers the product 70 to be introduced from the recognized products 70 in response to the selection operation.

Alternatively, the imaging control apparatus 22 may register the recognized products 70 without making the object introducer 60 select.

In this case, during the recording of the product review video, the imaging control apparatus 22 identifies, as the object to be introduced, the product 70 registered before the recording among the products 70 recognized in step S101.

Furthermore, the present embodiment has described the imaging control on the target subject as focus control, but the imaging control on the target subject may be of various other types of processing.

For example, when the imaging control apparatus 22 determines that it is the product introduction scene in step S102, it advances the process in the order of steps S103, S104, and S105, and performs AE control so that the exposure of the region of the selected product 70 becomes proper. When the imaging control apparatus 22 determines that it is the performance scene in step S102, it advances the process in the order of steps S103, S108, and S109, and performs AE control so that the exposure of the region of the face 62 of the selected target subject 60 becomes proper.

Furthermore, the imaging control apparatus 22 may perform the captured image processing control appropriate to the target subject as the imaging control in steps S105 and S109. Specifically, the white balance processing control, the contrast adjustment control, etc. can be done.

Using detection information on the region of the target subject in the frame, the imaging control apparatus 22 performs automatic white balance control so that the white balance of the region of the target subject becomes proper, or performs image quality correction processing or the like as contrast adjustment so that the contrast of the region of the target subject becomes proper.

For example, when the imaging control apparatus 22 determines that it is the product introduction scene in step S102, it advances the process in the order of steps S103, S104, and S105, and performs the captured image processing control on the selected product 70. When the imaging control apparatus 22 determines that it is the performance scene in step S102, it advances the process in the order of steps S103, S108, and S109, and performs the captured image processing control on the face 62 of the selected target subject 60.

Furthermore, in a case where the imaging control apparatus 22 determines that the current scene is the product introduction scene, it may perform processing to make the product 70 effectively attract attention.

For example, when the imaging control apparatus 22 determines that it is the product introduction scene in step S102, it advances the process in the order of steps S103, S104, and S105, and may perform image processing to blur background portions other than the selected product 70 as the captured image processing control appropriate to the target subject.

Figure 15:
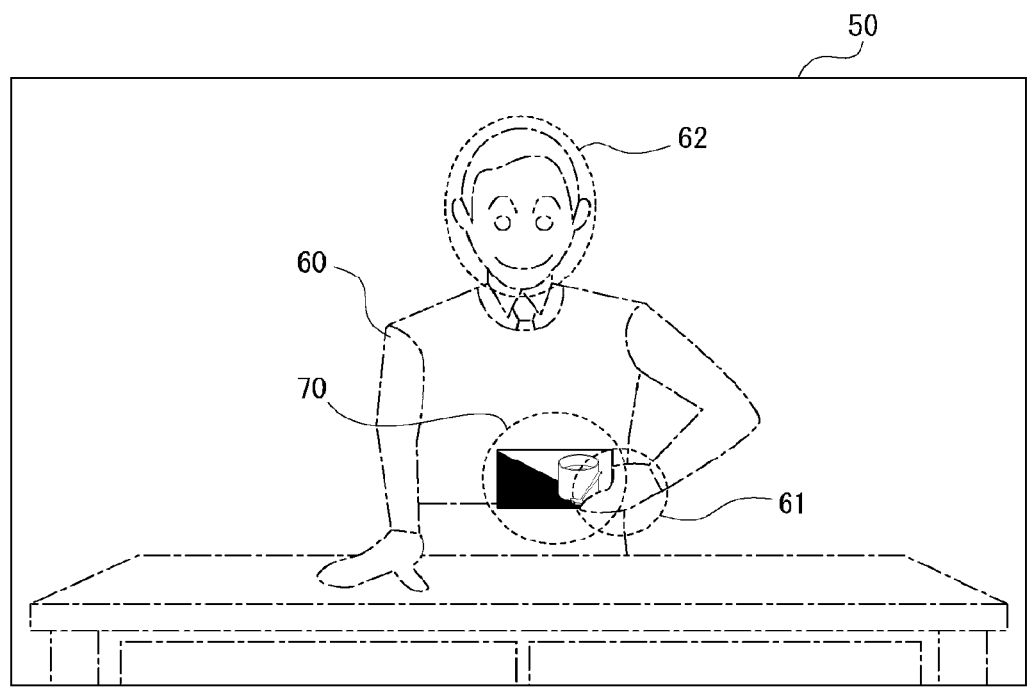
FIG. 15 is a diagram illustrating an example of imaging control according to the embodiments.

For example, on the captured image display screen 50 in FIG. 15, portions other than the product 70 are blurrily displayed. In FIG. 15, subjects blurrily displayed are indicated by dot-dash lines.

Figure 16:
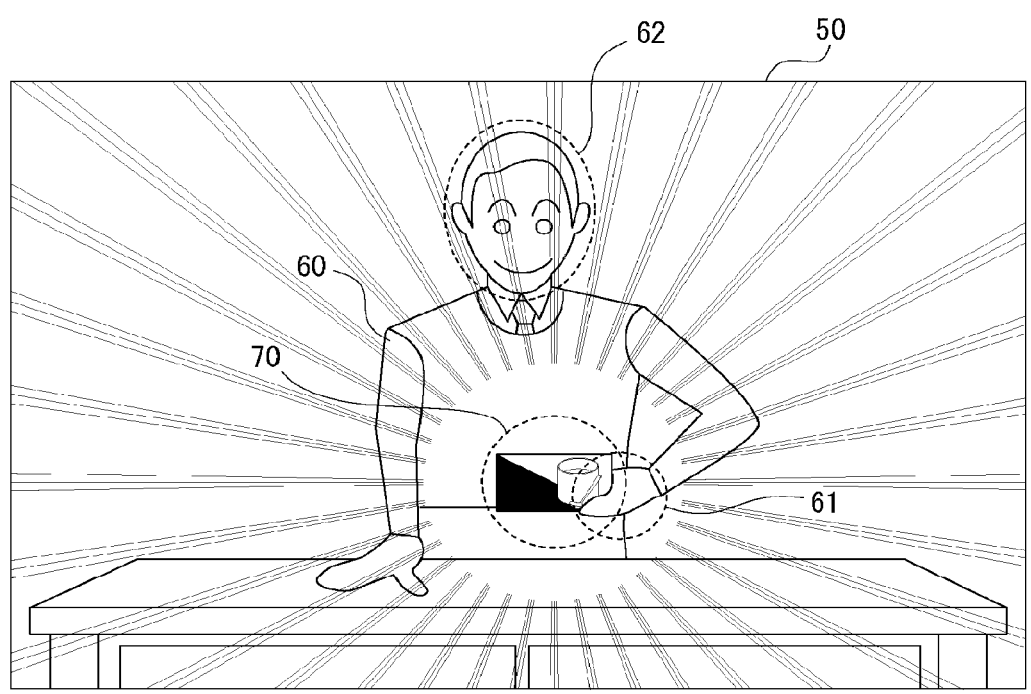
FIG. 16 is a diagram illustrating an example of imaging control according to the embodiments.

Furthermore, as illustrated in FIG. 16, the product 70 may be made prominent by arranging a plurality of concentrated lines around the selected product 70. Here, the concentrated lines refer to a plurality of lines arranged around a region, radially from its center.

For example, when the imaging control apparatus 22 determines that it is the product introduction scene in step S102, it advances the process in the order of steps S103, S104, and S105, and as the captured image processing control appropriate to the target subject, combines the captured image data acquired with concentrated line effect data to generate a concentrated line effect image in which a plurality of concentrated lines is arranged around the product 70.

Furthermore, imaging control appropriate to the type of the product 70 may be performed on the product 70 that is the target subject in the product introduction scene.

At this time, when identifying the product 70 in step S101, the imaging control apparatus 22 has determined the type of the product 70 by image analysis processing or the like. Then, when the imaging control apparatus 22 determines that the current scene is the product introduction scene in the scene determination processing in step S102, it advances the process in the order of steps S103 and S104 and selects the product 70 as the target subject.

Thereafter, the imaging control apparatus 22 transmits information on the type of the product 70 determined in step S101 to a cloud server in which imaging control information associated with the type of the product 70 is stored, and acquires the imaging control information appropriate to the product 70 from the cloud server.

In step S105, the imaging control apparatus 22 performs imaging control appropriate to the product 70 on the basis of the imaging control information acquired from the cloud server.

Note that the imaging control information associated with the type of the product 70 may be stored in the imaging device 1 in advance.

Various examples can be considered for the type of the product 70 and the imaging control associated with the type. For example, in a case where the type of the product 70 is a television device, a digital camera device, or the like with a display unit in which a flicker phenomenon can occur, SS control for a change to a shutter speed at which a flicker phenomenon does not occur is considered.

Note that while these types of control processing are performed in the case of the product introduction scene, in a case where the current scene is determined to be the performance scene, not the product introduction scene, the imaging control apparatus 22 is considered to advance the process in the order of steps S103, S108, and S109 and perform focus control to focus on the face 62 of the object introducer 60 as in the above-described embodiments. For example, assume that blurring of other portions, a concentrated line effect, control appropriate to the product type, etc. are not performed.

The following describes the scene determination processing in each embodiment.

Figure 17:
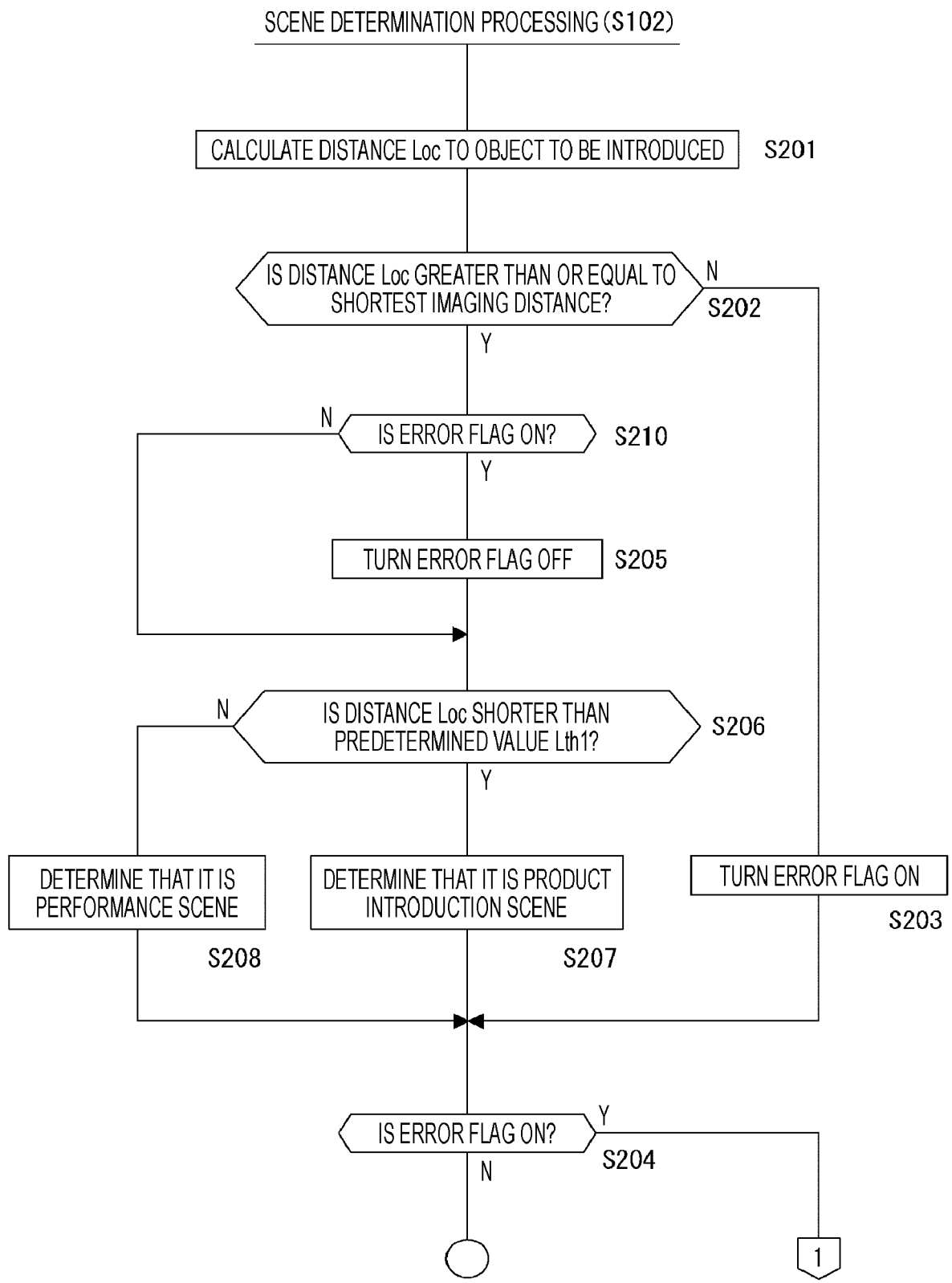
FIG. 17 is a flowchart of a process example according to the first embodiment.

FIG. 17 illustrates an example of the scene determination processing according to the first embodiment. The first embodiment is an example in which scene determination is performed using the distance Loc from the imaging device 1 to the product 70 as illustrated in FIGS. 4 and 5.

First, in step S201, the imaging control apparatus 22 calculates the distance Loc from the imaging device 1 to the product 70 to be introduced. For example, when a frame of captured image data is acquired, a phase difference signal is acquired, and a correlation operation is performed using the acquired phase difference signal to calculate the distance Loc from the imaging device 1 to the product 70 to be introduced.

Note that the imaging control apparatus 22 may calculate the distance Loc from the imaging device 1 to the product 70 on the basis of the position of the focus lens in contrast AF, or may calculate the distance Loc from the imaging device 1 to the product 70 using detection information of a dedicated distance measuring sensor using a phase difference sensor, an infrared sensor, or the like.

In step S202, the imaging control apparatus 22 determines whether or not the distance Loc from the imaging device 1 to the product 70 is greater than or equal to the shortest imaging distance.

Of distances from the imaging device 1 to a subject, the shortest imaging distance refers to the shortest distance at which focus control can be performed without blurring the subject. Thus, in a case where the distance Loc is shorter than the shortest imaging distance referred to here, the product 70 is blurred even when focus control is performed thereon. For example, in a case where the object introducer 60 brings the product 70 excessively close to the imaging device 1 to emphasize it, the distance Loc becomes shorter than the shortest imaging distance.

In such a case, proper imaging cannot be performed. Thus, in a case where the distance Loc is shorter than the shortest imaging distance, the imaging control apparatus 22 advances the process from step S202 to step S203 and sets the error flag to ON.

Here, the error flag is a flag indicating whether or not it is in a proper imaging state in which scene determination can be performed. The error flag being ON indicates a determination impossible state in which a focus controllable range is exceeded, unblurred video shooting cannot be performed, and target subject selection based on scene determination cannot be performed.

In a case where the error flag is turned on in step S203, the imaging control apparatus 22 advances the process from step S204 to step S106 in FIG. 14 and performs control to present the determination impossible state. For example, by the on-screen display of an icon or a message indicating the determination impossible state, turning on/off of a specific indication unit such as an LED, an error sound or a voice, or the like, presentation control for presenting the determination impossible state is performed.

Note that in a case where the display unit on which the captured image is displayed does not face the object introducer 60 side, it is preferable to perform the presentation control to the object introducer 60 using an indication unit other than the display unit, a voice, or the like.

Then, in step S107 in FIG. 14, the imaging control apparatus 22 generates metadata indicating that the error flag is on. The generated metadata is transmitted to the camera signal processing unit 16 and recorded in the recording medium in association with, for example, the corresponding frame of the captured image data. Thereafter, the imaging control apparatus 22 returns to step S101 in FIG. 14 to execute the above-described processing.

A case where the distance Loc is longer than the shortest imaging distance in step S202 in FIG. 15 is a case where error handling as described above is not particularly required.

In step S210, the imaging control apparatus 22 determines whether the error flag is ON. If the error flag is ON, the error flag is turned OFF in step S205, and then the process proceeds to step S206.

Furthermore, if it is determined in step S210 that the error flag is OFF, the imaging control apparatus 22 advances the process to step S206 without performing the processing in step S205.

In step S206, the imaging control apparatus 22 determines whether or not the calculated distance Loc is shorter than the predetermined value Lth1.

As understood from the above description of FIGS. 4 and 5, the predetermined value Lth1 is a reference value for determining whether the current scene is the performance scene or the product introduction scene. For example, if the distance Loc is shorter than the predetermined value Lth1, it is determined to be the product introduction scene, and if the distance Loc is greater than or equal to the predetermined value Lth1, it is determined to be the performance scene.

The predetermined value Lth1 may be set as desired by a person who performs shooting, or may be set in the imaging device 1 in advance. Alternatively, for example, before the start of imaging or during imaging, processing may be performed to set the predetermined value Lth1 for the current imaging from actually measured distance data. For example, the predetermined value Lth1 may be determined by measuring the distance to the object introducer 60 and performing subtraction of a proper distance from that distance or the like.

When the imaging control apparatus 22 determines in step S206 that the distance Loc is shorter than the predetermined value Lth1, it determines in step S207 that the current scene is the product introduction scene.

Then, the imaging control apparatus 22 advances the process in the order of step S204 and steps S103 and S104 in FIG. 14, selects the product 70 identified in step S101 as the target subject, and executes in step S105, for example, focus control as the imaging control on the product 70 that is the target subject. Of course, as described above, the imaging control apparatus 22 may perform as the imaging control various types of control such as SS control to prevent a flicker phenomenon, luminance processing, and image effect processing, separately from focus control or in addition to focus control.

Thereafter, the imaging control apparatus 22 performs the processing in steps S106 and S107.

If the imaging control apparatus 22 does not determine in step S206 in FIG. 17 that the distance Loc is shorter than the predetermined value Lth1, it determines in step S208 that the current scene is the performance scene.

After that, the imaging control apparatus 22 advances the process in the order of step S204 and steps S103 and S108 in FIG. 14, selects the object introducer 60 identified in step S101 as the target subject, and executes in step S109, for example, focus control or the like as the imaging control on the face 62 of the object introducer 60 who is the target subject. Then, the imaging control apparatus 22 performs the processing in steps S106 and S107.

As described above, according to the first embodiment, by performing scene determination on the basis of the distance Loc from the imaging device 1 to the product 70, scene determination based on the subject positional relationship between the object introducer 60 and the product 70 to be introduced is performed.

The scene determination processing according to the second embodiment will be described with reference to FIG. 18. The second embodiment is an example in which scene determination is performed using the distance Lho from the object introducer 60 to the product 70 as illustrated in FIGS. 6 and 7.

In step S251, the imaging control apparatus 22 calculates the distance Loc from the imaging device 1 to the product 70 and the distance Lhc from the imaging device 1 to the object introducer 60. In addition, the distance Lho between the object introducer 60 and the product 70 is determined by the calculation of distance Lhc−distance Loc.

In step S252, the imaging control apparatus 22 determines whether or not either the distance Loc from the imaging device 1 to the product 70 or the distance Lhc from the imaging device 1 to the object introducer 60 is greater than or equal to the shortest imaging distance.

In a case where either the distance Loc or the distance Lhc is shorter than the shortest imaging distance, proper imaging cannot be performed. Thus, the imaging control apparatus 22 advances the process from step S252 to step S258, sets the error flag to ON, and determines that it is in the determination impossible state.

In this case, the imaging control apparatus 22 advances the process from step S259 to step S106 in FIG. 14 and performs control to present the determination impossible state.

Then, in step S107 in FIG. 14, the imaging control apparatus 22 generates metadata indicating that the error flag is on, and thereafter, returns to step S101 to execute the above-described processing. The above is similar to that of the first embodiment described with reference to FIG. 17.

Figure 18:
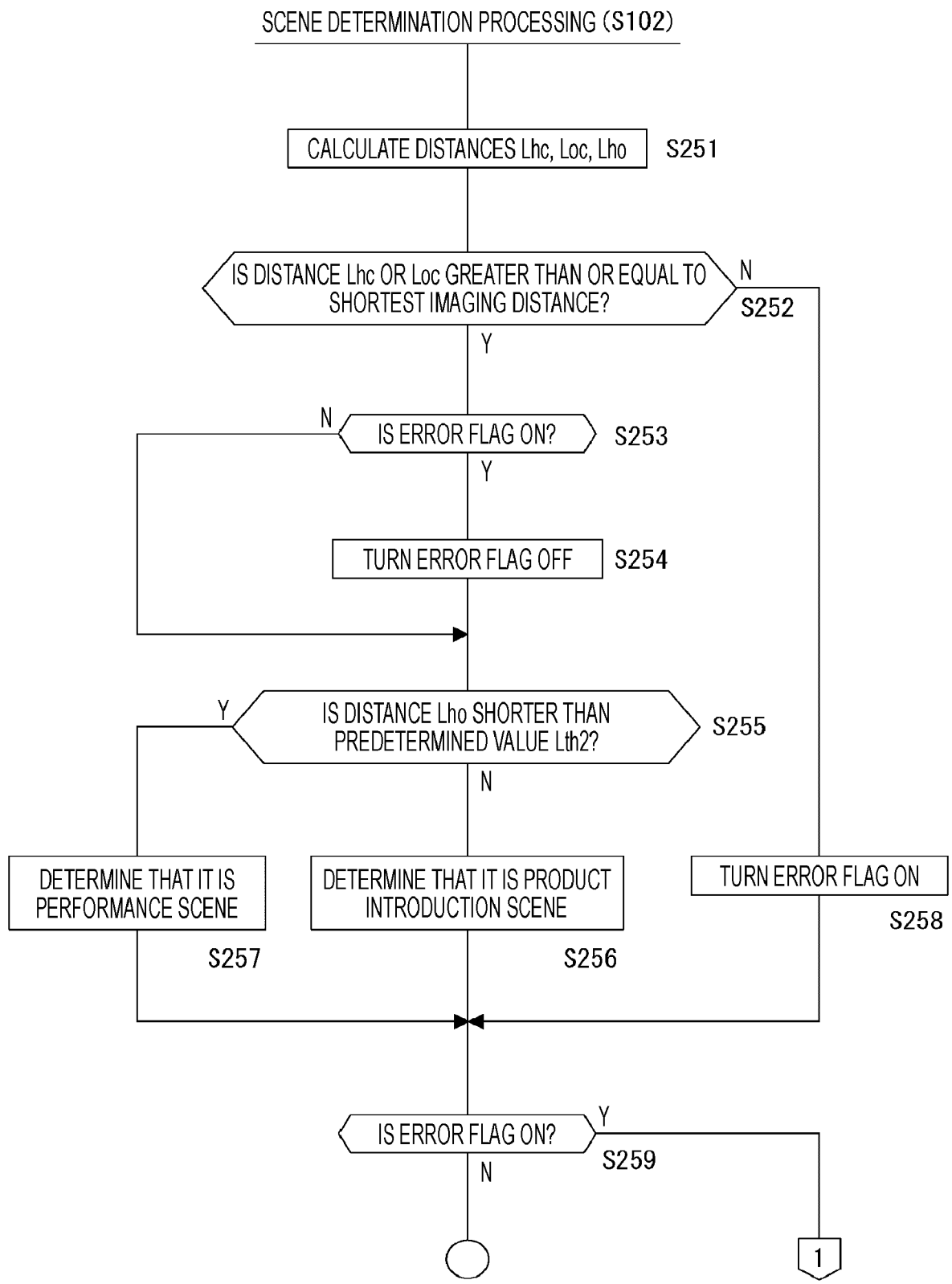
FIG. 18 is a flowchart of a process example according to the second embodiment.

In a case where the distance Loc is greater than or equal to the shortest imaging distance in step S252 in FIG. 18, the imaging control apparatus 22 determines whether the error flag is ON in step S253. If the error flag is ON, the error flag is turned OFF in step S254 and then the process proceeds to step S255.

Furthermore, if it is determined in step S253 that the error flag is OFF, the imaging control apparatus 22 advances the process to step S255 without performing the processing in step S254.

In step S255, the imaging control apparatus 22 determines whether or not the calculated distance Lho is shorter than the predetermined value Lth2.

As understood from the above description of FIGS. 6 and 7, the predetermined value Lth2 is a reference value for determining whether the current scene is the performance scene or the product introduction scene. For example, if the distance Lho is shorter than the predetermined value Lth2, it is determined to be the performance scene, and if the distance Lho is greater than or equal to the predetermined value Lth2, it is determined to be the product introduction scene.

The predetermined value Lth2 may be set as desired by a person who performs shooting, or may be set in the imaging device 1 in advance. Alternatively, for example, before the start of imaging or during imaging, processing may be performed to set the predetermined value Lth2 for the current imaging from actually measured distance data. For example, the predetermined value Lth2 may be properly determined on the basis of the scene distance Lhc and distance Loc measured at a point in time before product introduction is reached (for example, at the start of imaging).

When the imaging control apparatus 22 determines in step S255 that the distance Lho is shorter than the predetermined value Lth2, it determines in step S257 that the current scene is the performance scene.

Then, the imaging control apparatus 22 advances the process in the order of step S259 and steps S103 and S108 in FIG. 14, selects the object introducer 60 identified in step S101 as the target subject, and executes in step S109, for example, focus control or the like as the imaging control on the face 62 of the object introducer 60 who is the target subject. Then, the imaging control apparatus 22 performs the processing in steps S106 and S107.

If the imaging control apparatus 22 does not determine in step S255 in FIG. 18 that the distance Lho is shorter than the predetermined value Lth2, it determines in step S256 that the current scene is the product introduction scene.

Then, the imaging control apparatus 22 advances the process in the order of step S259 and steps S103 and S104 in FIG. 14, selects the product 70 identified in step S101 as the target subject, and executes in step S105, for example, focus control or the like as the imaging control on the product 70 that is the target subject. Thereafter, the imaging control apparatus 22 performs the processing in steps S106 and S107.

As described above, according to the second embodiment, by performing scene determination on the basis of the distance Lho from the object introducer 60 to the product 70, scene determination based on the subject positional relationship between the object introducer 60 and the product 70 to be introduced is performed.

Note that as described above, in a scene in which the object introducer 60 introduces the product 70, the object introducer 60 may bring the product 70 close to himself or herself by the hand 61 to introduce it. When such behavior is assumed, the logic of step S255 can be reversed.

That is, the imaging control apparatus 22 determines that the current scene is the product introduction scene on the basis of the fact that the distance Lho has become shorter than the predetermined value, and determines that the current scene is the performance scene if the distance Lho is greater than or equal to the predetermined value.

Note that in the first and second embodiments, the imaging control apparatus 22 performs scene determination on the basis of the distance Loc from the imaging device 1 to the product 70 or the distance Lho between the object introducer 60 and the product 70, but scene determination may be performed on the basis of the distance from the imaging device 1 to the object introducer 60.

The scene determination processing according to the third embodiment will be described with reference to FIG. 19. The third embodiment is an example in which scene determination is performed according to the state of a part of the body of the object introducer 60. Here, as an example, an example will be described in which scene determination is performed according to the state of the hand 61 of the object introducer 60.

In step S301, the imaging control apparatus 22 determines the state of the hand 61 of the object introducer 60. That is, the imaging control apparatus 22 determines whether or not the hand 61 is in an object identification state by performing image analysis processing using the frame of image data acquired in step S101 in FIG. 14.

Here, the object identification state refers to a state in which the product 70 to be introduced can be identified from the hand 61 of the object introducer 60, and is, for example, a state in which the hand 61 is in contact with the product 70, for example, the hand 61 holds, pinches, or grasps the product 70, a state in which a gesture for the identification of the product 70 is made with the hand 61, for example, the hand 61 of the object introducer 60 points at the product 70, or the like.

Note that the imaging control apparatus 22 is considered to determine whether or not the hand 61 is in the object identification state by performing image analysis processing using the acquired frame of image data. However, by acquiring a plurality of frames of image data and performing image analysis processing or the like, the movement of the hand 61 may be detected from changes in the image data between the frames, to determine whether or not the hand 61 is in the object identification state on the basis of the movement.

When the imaging control apparatus 22 determines in step S302 that the hand 61 is in the object identification state, it determines in step S303 that the current scene is the product introduction scene.

Thereafter, the imaging control apparatus 22 advances the process in the order of steps S103 and S104 as in FIG. 14, selects the product 70 identified in step S101 as the target subject, and executes in step S105 focus control to focus on the product 70 that is the target subject. Then, the imaging control apparatus 22 performs the processing in steps S106 and S107.

Note that in a case where the hand 61 is in the object identification state in which the hand 61 is in contact with the product 70, for example, it holds the product 70, the imaging control apparatus 22 may perform in step S105 focus control or the like suitable for the region of the hand 61 in contact with the product 70.

Performing focus control on the region of the hand 61 of the object introducer 60 allows video shooting focused also on the product 70 in contact with the hand 61. This is particularly effective in a case where the product 70 is too small to perform focus control on the product 70 itself.

On the other hand, when the imaging control apparatus 22 determines in step S302 that the hand 61 is not in the object identification state, it determines in step S304 that the current scene is the performance scene.

After that, the imaging control apparatus 22 advances the process in the order of steps S103 and S108 in FIG. 14, selects the object introducer 60 identified in step S101 as the target subject, and executes in step S109 focus control on the face 62 of the object introducer 60 who is the target subject. Then, the imaging control apparatus 22 performs the processing in steps S106 and S107.

As described above, according to the third embodiment, by performing scene determination on the basis of whether or not the hand 61 of the object introducer 60 is in the object identification state, scene determination based on the subject positional relationship between the hand 61 of the object introducer 60 and the product 70 to be introduced is performed.

Note that the third embodiment may take the following form. A modification of the third embodiment will be described with reference to FIG. 20.

This example is an example in which scene determination is performed on the basis of the subject positional relationship, using the state of the hand 61 that is a part of the body of the object introducer 60 and the distance from the imaging device 1 to the product 70 based on the subject positional relationship.

First, in step S401, the imaging control apparatus 22 determines the state of the hand 61 of the object introducer 60. That is, the imaging control apparatus 22 determines whether or not the hand 61 is in the object identification state such as holding the product 70 by performing image analysis processing using the frame of image data acquired in step S101 in FIG. 14.

When the imaging control apparatus 22 determines in step S402 that the hand 61 is not in the object identification state, it determines in step S403 that the current scene is the performance scene.

Figure 20:
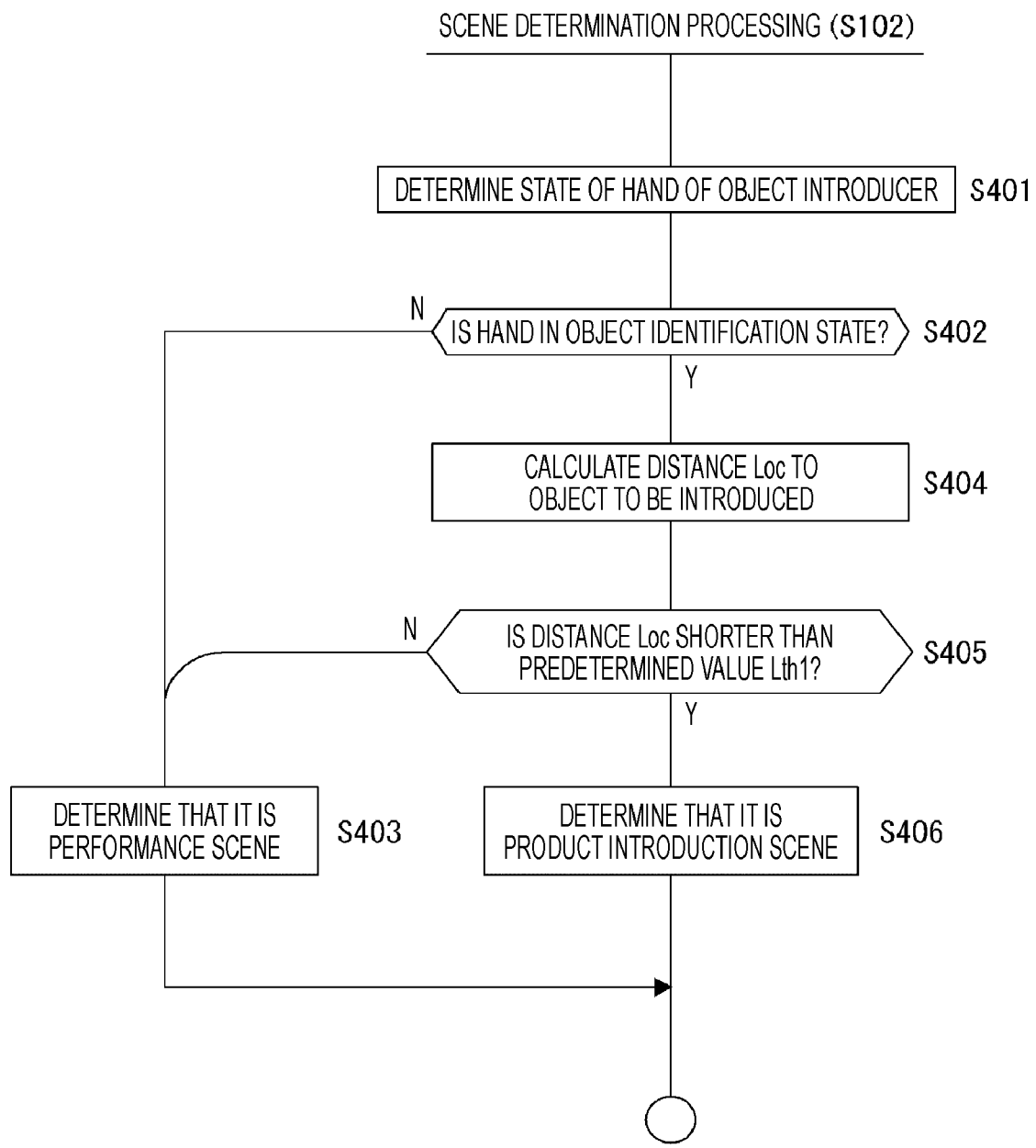
FIG. 20 is a flowchart of a process example according to a modification of the third embodiment.

After that, the imaging control apparatus 22 completes the processing in FIG. 20, advances the process in the order of steps S103 and S108 in FIG. 14, selects the object introducer 60 identified in step S101 as the target subject, and executes in step S109 focus control on the region of the face 62 of the object introducer 60 who is the target subject. Then, the imaging control apparatus 22 performs the processing in steps S106 and S107.

When the imaging control apparatus 22 determines in step S402 in FIG. 20 that the hand 61 is in the object identification state, it advances the process to step S404 and calculates the distance Loc from the imaging device 1 to the product 70 to be introduced.

In step S405, the imaging control apparatus 22 determines whether or not the calculated distance Loc is shorter than the predetermined value.

When the imaging control apparatus 22 determines in step S405 that the distance Loc is shorter than the predetermined value Lth1, it determines in step S406 that the current scene is the product introduction scene.

After that, the imaging control apparatus 22 completes the processing in FIG. 20, advances the process in the order of steps S103 and S104 in FIG. 14, selects the product 70 identified in step S101 as the target subject, and executes in step S105 focus control on the product 70 that is the target subject. Then, the imaging control apparatus 22 performs the processing in steps S106 and S107.

When the imaging control apparatus 22 determines in step S405 that the distance Loc is greater than or equal to the predetermined value Lth1, it determines in step S403 that the current scene is the performance scene.

After that, the imaging control apparatus 22 completes the processing in FIG. 20, advances the process in the order of steps S103 and S108 in FIG. 14, selects the object introducer 60 identified in step S101 as the target subject, and executes in step S109 focus control on the face 62 of the object introducer 60 who is the target subject. Then, the imaging control apparatus 22 performs the processing in steps S106 and S107.

As described above, by performing scene determination on the basis of the state of the hand 61 of the object introducer 60 and the distance Loc from the product 70 to the imaging device 1, scene determination based on the subject positional relationship between the object introducer 60 and the product 70 to be introduced is performed.

For example, in the product review video, the object introducer 60 may hold the product 70 with the hand 61 (that is, it may be in the object identification state) even when the product 70 is not shown and introduced. In such a case, if focus control is performed on the hand 61 on the basis of the state of the hand 61 of the object introducer 60 such as holding, focus control can be performed on the product 70 even though it is actually the performance scene.

Therefore, by performing scene determination with the state of the distance Loc from the imaging device 1 to the product 70 taken into account in addition to the state of the hand 61 of the object introducer 60, imaging control such as focus control in which the intention of the object introducer is reflected more can be performed. That is, the accuracy of scene determination by the imaging control apparatus 22 can be improved.

Note that in scene determination, the imaging control apparatus 22 in this example calculates the distance Loc from the imaging device 1 to the product 70 to be introduced in step S404, but it may calculate the distance from the imaging device 1 to the hand 61 of the object introducer 60 in a case where the hand 61 is in the object identification state such as holding the product 70.

This is because in a state in which the hand 61 is in contact with the product 70, for example, the hand 61 holds the product 70, the distance from the imaging device 1 to the product 70 can be estimated on the basis of the distance from the imaging device 1 to the hand 61.

Furthermore, at this time, the imaging control apparatus 22 may perform focus control on the hand 61 in contact with the product 70 in step S105. This also allows video shooting focused on the product 70.

Furthermore, although not described in this example, in a case where the distance Loc from the imaging device 1 to the product 70 is shorter than the shortest imaging distance, the imaging control apparatus 22 may set the error flag indicating the determination impossible state to ON and perform an error display on the display unit of the imaging device 1.

The scene determination processing according to the fourth embodiment will be described with reference to FIG. 21. The fourth embodiment is an example in which scene determination is performed on the basis of the ratio of the region of the product 70 to be introduced to the entire frame of the captured image. The ratio in this case corresponds to the subject positional relationship.

First, in step S501, the imaging control apparatus 22 calculates the ratio of the product 70 to be introduced to the entire frame of the captured image. That is, the imaging control apparatus 22 calculates the ratio P of the area of the product 70 to the area of the entire frame of the captured image.

Thereafter, in step S502, the imaging control apparatus 22 determines whether or not the ratio P of the area of the product 70 to the area of the entire frame of the captured image is greater than a predetermined value thP. The predetermined value thP referred to here is a reference value for determining whether the current scene is the performance scene or the product introduction scene. On the basis of the fact that the ratio P is greater than the predetermined value thP, it is determined to be the product introduction scene.

If the ratio P of the area of the product 70 to the area of the entire frame of the captured image is greater than the predetermined value thP, the imaging control apparatus 22 determines in step S503 that the current scene is the product introduction scene.

It can be said that an increase in the ratio P of the area of the product 70 to the area of the entire frame of the captured image indicates a decrease in the distance between the product 70 and the imaging device 1. Thus, it can be estimated that the object introducer 60 is about to introduce the product 70, bringing the product 70 close to the imaging device 1.

Thus, scene determination based on the ratio P of the area of the product 70 as in the present embodiment can also be said to be scene determination indirectly based on the distance relationship between the product 70 and the imaging device 1. That is, in the present embodiment, the positional relationship between the product 70 and imaging device 1 is detected in a physical quantity different from a distance.

After that, the imaging control apparatus 22 advances the process in the order of step S503 and steps S103 and S104 in FIG. 14, selects the product 70 identified in step S101 as the target subject, and executes in step S105 focus control on the product 70 that is the target subject. Then, the imaging control apparatus 22 performs the processing in steps S106 and S107.

Figure 21:
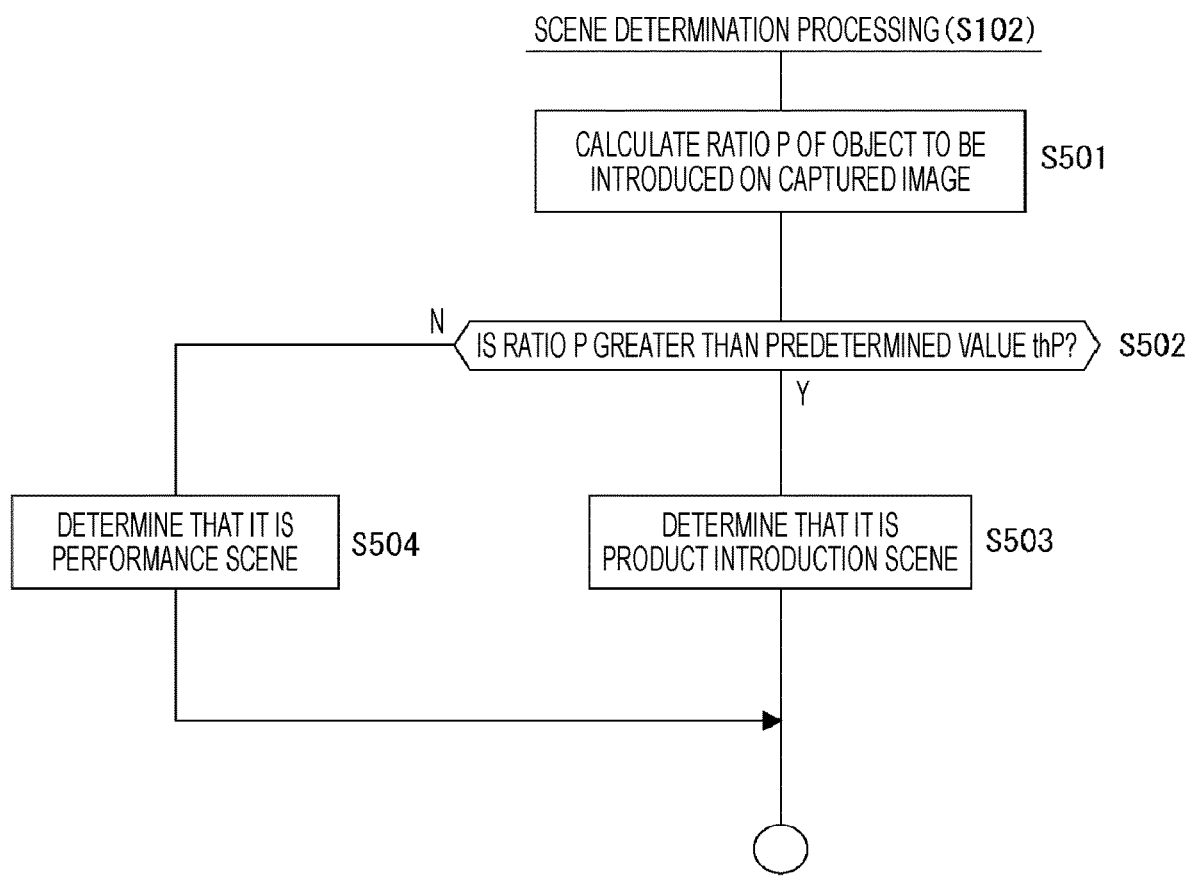
FIG. 21 is a flowchart of a process example according to the fourth embodiment.

If the ratio P of the area of the product 70 to the area of the entire frame of the captured image is less than or equal to the predetermined value thP in step S502 in FIG. 21, the imaging control apparatus 22 determines in step S504 that the current scene is the performance scene.

After that, the imaging control apparatus 22 advances the process in the order of step S504 and steps S103 and S108 in FIG. 14, selects the object introducer 60 identified in step S101 as the target subject, and executes in step S109 focus control on the face 62 of the object introducer 60 who is the target subject. Then, the imaging control apparatus 22 performs the processing in steps S106 and S107.

According to the fourth embodiment described above, scene determination is performed on the basis of the ratio of the product 70 to be introduced to the entire frame of the captured image, so that scene determination is performed on the basis of the subject positional relationship between the hand 61 of the object introducer 60 and the product 70 to be introduced.

Note that in the present embodiment, the imaging control apparatus 22 performs scene determination on the basis of the ratio of the product 70 to be introduced to the entire frame of the captured image, but may perform scene determination on the basis of the ratio of the region of the object introducer 60 to the entire frame of the captured image.

For example, in step S501, the imaging control apparatus 22 calculates the ratio P1 of the area of the region of the object introducer 60 to the area of the captured image, and in step S502, determines whether or not the ratio P1 is smaller than a predetermined value thP'. The predetermined value thP' referred to here is a reference value for determining whether the current scene is the performance scene or the product introduction scene. On the basis of the fact that the ratio P1 is smaller than the predetermined value thP', it is determined to be the product introduction scene.

If the ratio P1 of the area of the object introducer 60 to the area of the captured image is smaller than the predetermined value thP', the imaging control apparatus 22 determines in step S503 that the current scene is the product introduction scene.

Furthermore, if the ratio P1 is greater than or equal to the predetermined value thP', the imaging control apparatus 22 determines in step S504 that the current scene is the performance scene.

This is because from the fact that the ratio P1 of the area of the object introducer 60 to the area of the captured image becomes greater than or equal to the predetermined value thP', it can be estimated that the object introducer 60 is approaching the imaging device 1 to give a performance.

Furthermore, the imaging control apparatus 22 may perform scene determination on the basis of both the ratio P of the product 70 to be introduced on the captured image and the ratio P1 of the object introducer 60 on the captured image.

For example, if the ratio P of the area of the product 70 to the area of the captured image becomes larger than the predetermined value thP, and the ratio P1 of the area of the object introducer 60 to the area of the captured image becomes smaller than the predetermined value thP', the imaging control apparatus 22 can determine that the current scene is the product introduction scene, and if not, it can determine that the current scene is the performance scene.

Furthermore, the imaging control apparatus 22 may perform scene determination on the basis of not only the ratio of the product 70 or the object introducer 60 on the captured image but also the ratio in area between the product 70 and the object introducer 60.

5. SUMMARY AND MODIFICATIONS

The imaging control apparatus 22 mounted in the imaging device 1 according to the above embodiments includes the identification unit 22a that identifies an object to be introduced (the product 70) and the object introducer 60 who introduces the object to be introduced (the product 70) that are subjects in captured image data obtained by the imaging unit 13 of the imaging device 1, the selection unit 22b that selects one of the object to be introduced (the product 70) and the object introducer 60 as a target subject on the basis of the positional relationship between at least any two of the object to be introduced (the product 70), the object introducer 60, and the imaging device 1, and the imaging control unit 22c that performs imaging control on the subject selected as the target subject by the selection unit 22b (see FIGS. 14 and FIGS. 17 to 21).

Thus, for example, even if the object introducer 60 is in a state of being unable to operate the imaging device 1, such as giving a performance for a product review video or the like at a distance from the imaging device 1 in which the imaging control apparatus 22 is mounted, the imaging control apparatus 22 automatically performs imaging control suitable for the scene according to the movement of the hand 61 such as moving, holding, or pointing at a product. This allows the object introducer 60 to shoot a video subjected to imaging control in which the intention of the object introducer 60 is reflected, without operating the imaging device 1 during performance shooting.

Note that the positional relationship between at least any two of the object to be introduced, the object introducer, and the imaging device 1 includes the positional relationship between the object introducer 60 and the object to be introduced as in the second and third embodiments, the positional relationship between the object to be introduced and the imaging device 1 as in the first and fourth embodiments, and also the positional relationship between the imaging device 1 and the object introducer 60. Examples corresponding to the positional relationship between the imaging device 1 and the object introducer 60 include, for example, an example in which scene determination (selection of the target subject) is performed on the basis of whether or not the ratio P1 of the area of the object introducer 60 to the area of the captured image is smaller than the predetermined value thP' described in the fourth embodiment. Of course, scene determination (selection of the target subject) may be performed by comparing the distance Lhc in FIG. 6 with an appropriate threshold. Furthermore, an example of the positional relationship may be the positional relationships between the three, the object introducer, the object to be introduced, and the imaging device.

In the imaging control apparatus 22 according to each embodiment, the selection unit 22*b* performs the scene determination processing on the captured image on the basis of the subject positional relationship, and can select one of the product 70 to be introduced and the object introducer 60 as the target subject depending on the scene determined in the scene determination processing (see step S102 in FIG. 14).

This allows imaging control such as focus control to be performed appropriately on the target subject suitable for each scene. Consequently, video shooting in which the intention of the object introducer 60 is reflected can be performed without direct operation of the imaging device 1 during video shooting.

For example, in the product review video, focus control or the like can be performed with the product 70 as the target subject in the product introduction scene that is a scene to introduce the product 70, and focus control or the like can be performed with the object introducer 60 as the target subject in the performance scene that is a scene for the object introducer 60 to give a performance. Thus, focus control or the like suitable for the subject to which attention should be paid in the current scene can be performed.

In the imaging control apparatus 22 according to the first embodiment, the selection unit 22*b* selects one of the object to be introduced (the product 70) and the object introducer 60 as the target subject on the basis of the positional relationship between the object to be introduced (the product 70) and the imaging device 1. That is, the imaging control apparatus 22 performs the scene determination processing on the basis of the positional relationship between the product 70 and the imaging device 1 (see S102 in FIG. 14 and FIG. 17).

For example, the selection unit 22*b* selects one of the object to be introduced (the product 70) and the object introducer 60 as the target subject on the basis of the positional relationship of the product 70 with respect to the imaging device 1.

This allows the object introducer 60 to shoot a video subjected to imaging control in which the intention of the object introducer 60 is reflected, without operating the imaging device 1 during shooting.

In particular, in the first embodiment, the selection unit 22*b* selects one of the object to be introduced (the product 70) and the object introducer 60 as the target subject on the basis of the distance Loc from the imaging device 1 to the object to be introduced (the product 70) resulting from the positional relationship between the object to be introduced (the product 70) and the imaging device 1.

For example, in the product review video, the object introducer 60 may bring the product 70 close to the imaging lens of the imaging device 1 to make viewers pay attention to the product 70 to be introduced. In such a case, for example, on the basis of the fact that the distance from the product 70 to be introduced to the imaging device 1 has become shorter than the predetermined value, the current scene is determined to be the product introduction scene, allowing imaging control such as focus control appropriate to the region of the product 70 selected as the target subject to be performed in the product introduction scene. In particular, the distance measurement allows scene determination and appropriate control, facilitating the control.

In the imaging control apparatus 22 according to the second embodiment, the selection unit 22*b* selects one of the object to be introduced (the product 70) and the object introducer 60 as the target subject on the basis of the positional relationship between the object to be introduced (the product 70) and the object introducer 60. That is, the imaging control apparatus 22 performs the scene determination processing on the basis of the positional relationship between the product 70 and the object introducer 60 (see step S102 in FIG. 14 and FIG. 17).

The positional relationship between the product 70 and the object introducer 60 can be determined on the basis of the respective distances of the product 70 and the object introducer 60 from the imaging device 1.

Thus, the selection of the target subject based on the positional relationship between the product 70 and the object introducer 60 allows the object introducer 60 to shoot a video subjected to imaging control in which the intention of the object introducer 60 is reflected, without operating the imaging device 1 during shooting.

Furthermore, scene determination and target subject selection based on the positional relationship between the object to be introduced (the product 70) and the object introducer 60 are less affected by the forward and backward movements of the object introducer 60, so that the accuracy of scene determination and target subject selection can be maintained.

In particular, in the second embodiment, the selection unit 22*b* selects one of the object to be introduced (the product 70) and the object introducer 60 as the target subject on the basis of the distance Lho from the object introducer 60 to the object to be introduced (the product 70) resulting from the positional relationship between the object to be introduced (the product 70) and the imaging device 1.

This allows scene determination by easily grasping the positional relationship between the object introducer 60 and the product 70 and allows control by setting the target subject suitable for the scene.

Figure 19:
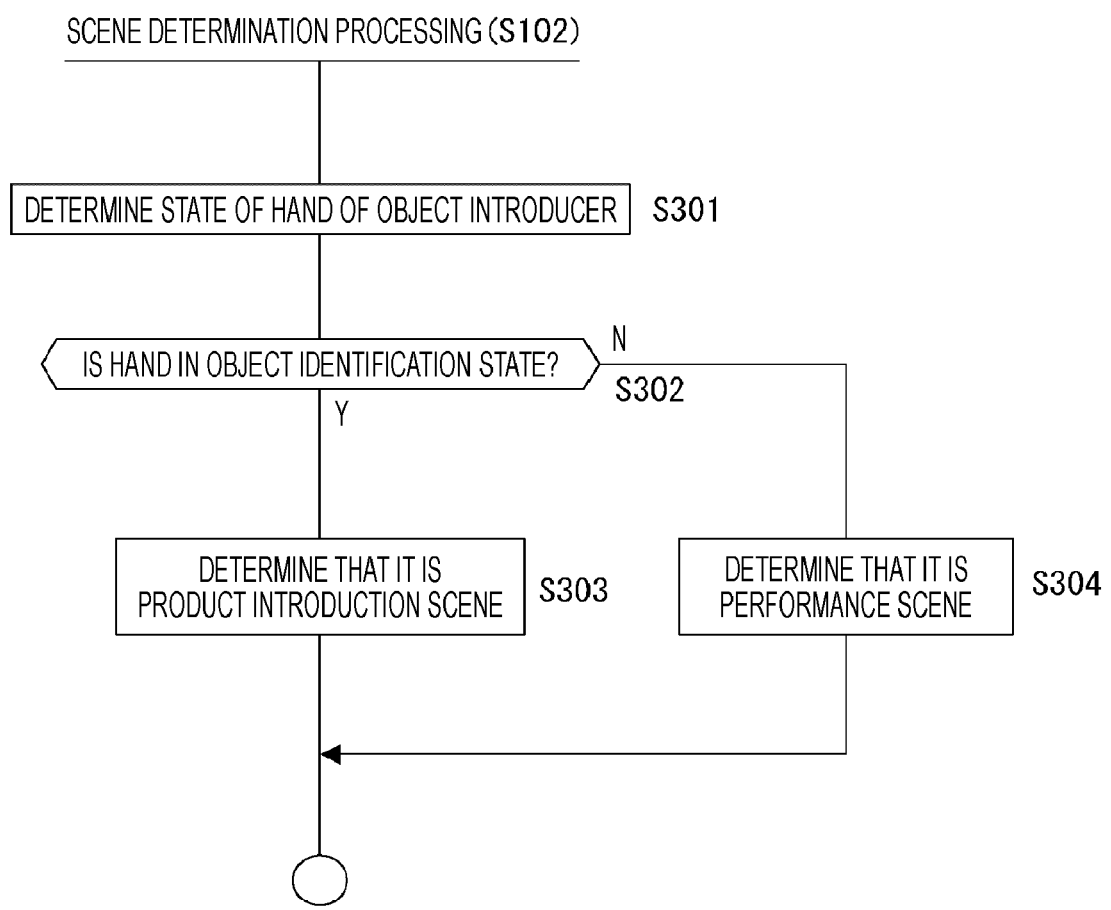
FIG. 19 is a flowchart of a process example according to the third embodiment.

In the imaging control apparatus 22 according to the third embodiment, the selection unit 22*b* selects one of the object to be introduced (the product 70) and the object introducer 60 as the target subject on the basis of the state of a part of the body of the object introducer 60, and imaging control such as focus control suitable for the selected target subject is performed (see FIG. 19). In particular, one of the object to be introduced and the object introducer is selected as the target subject on the basis of the positional relationship between the object to be introduced (the product 70) and the object introducer 60 depending on the state of the hand 61 of the object introducer 60.

For example, the selection unit 22b selects one of the object to be introduced (the product 70) and the object introducer 60 as the target subject on the basis of a state in which the hand 61 of the object introducer 60 is in contact with the object to be introduced (the product 70), and performs imaging control such as focus control suitable for the region of the selected target subject.

A state in which the hand 61 of the object introducer 60 is not in contact with the product 70 is considered to be the performance scene in which the object introducer 60 is giving a performance such as an opening speech. In this case, focus control is performed on the face 62 with the object introducer 60 as the target subject. This can make the object introducer 60 giving the performance prominent in the performance scene.

On the other hand, in a state in which the hand 61 of the object introducer 60 is in contact with the product 70, for example, holds the product 70, the scene being imaged is considered to be the product introduction scene for introducing the product 70. Consequently, focus control is performed on the product 70 to be introduced, so that the product 70 to be introduced can be made prominent.

Thus, by determining one of the product 70 and the object introducer 60 as the target subject on the basis of the state of the hand 61 of the object introducer 60, imaging control suitable for each subject can be executed depending on each scene. Accordingly, video shooting in which the intention of the object introducer 60 is reflected more can be done.

Furthermore, in the third embodiment, the selection unit 22b selects one of the object to be introduced (the product 70) and the object introducer 60 as the target subject on the basis of a state in which the hand 61 of the object introducer 60 points at the object to be introduced (the product 70), and performs imaging control such as focus control on the selected target subject (see FIG. 20).

For example, a state in which the hand 61 of the object introducer 60 is not making a gesture such as pointing is considered to be the performance scene in which the object introducer 60 is giving a performance. In this case, focus control is performed on the face 62 with the object introducer 60 as the target subject. This can make the object introducer 60 giving the performance prominent.

On the other hand, a state in which the hand 61 of the object introducer 60 is making a gesture such as pointing at the product 70 is considered to be the product introduction scene in which the object introducer 60 introduces the product 70. Thus, by performing focus control on the product 70 to be introduced, the product 70 to be introduced can be made prominent.

As described above, scene determination can also be performed on the basis of the state of a gesture such as pointing by the hand 61 of the object introducer 60, and imaging control suitable for each subject can be executed depending on each scene. Accordingly, video shooting in which the intention of the object introducer 60 is reflected more can be done.

In the imaging control apparatus 22 according to the fourth embodiment, the selection unit 22b selects one of the object to be introduced (the product 70) and the object introducer 60 as the target subject on the basis of one or both of the ratio of the region of the object to be introduced (the product 70) to the entire frame of the captured image and the ratio of the region of the object introducer 60 to the entire frame of the captured image, which are the positional relationships (see FIG. 21).

For example, in the product review video, the object introducer 60 may bring the product 70 close to the imaging lens of the imaging device 1 to make viewers pay attention to the product 70 to be introduced. At this time, the ratio of the product 70 to be introduced on the captured image increases due to the change in the subject positional relationship.

Then, for example, on the basis of the fact that the ratio of the product 70 to be introduced on the captured image has become larger than the predetermined value, the current scene is determined to be the product introduction scene, and imaging control such as focus control can be executed on the product 70 selected as the target subject in the product introduction scene.

The first and second embodiments have described the examples in which the positional relationships between the object introducer 60, the object to be introduced (the product 70), and the imaging device 1 are regarded as distance relationships. The determination of distance relationship allows relatively easy scene determination and target subject selection by a comparison between distances or a comparison between a distance and a predetermined value (threshold).

Furthermore, the distance relationships may be the distances between the object introducer 60, the object to be introduced (the product 70), and the imaging device 1. That is, scene determination and target subject selection may be performed on the basis of two or all of the distance Lho between the object introducer 60 and the object to be introduced, the distance Loc between the object to be introduced and the imaging device 1, and the distance Lhc between the imaging device 1 and the object introducer 60.

As a possible example of scene determination based on the respective distances between the three, if the distance Lhc between the object introducer 60 and the product 70 is too long, it is determined that it is not an introduction scene (for example, the object introducer 60 is going to get another product) even when the distance Loc between the product 70 and the imaging device 1 is less than or equal to the predetermined value Lth1.

Alternatively, for the performance scene, it may be further set as a condition that the distance Lhc between the object introducer 60 and the imaging device 1 is within a certain range.

In the imaging control apparatus 22 according to each embodiment, the identification unit 22a identifies the object to be introduced (the product 70) on the basis of the captured image data (see S101 in FIG. 14). That is, the identification unit 22a performs, for example, image analysis processing or the like on the captured image data acquired from the imaging unit 13 to identify the product 70 to be introduced from subjects appearing in the image data. Consequently, the product 70 corresponding to the subject being imaged is identified.

In each embodiment, the imaging control apparatus 22 may detect the hand 61 of the object introducer 60 on the basis of the captured image data, and identify the object to be introduced (the product 70) on the basis of the position of the detected hand 61. This allows the product 70 to be introduced to be identified by estimating the position of the product 70 from the position of the hand 61 even in a case where the product 70 cannot be detected on the basis of the image data.

In the imaging control apparatus 22 according to each embodiment, the example has been described in which the identification unit 22a identifies the object to be introduced (the product 70) on the basis of the state of a part of the body (the hand 61) of the object introducer (see S101 in FIG. 14).

This allows the product 70 to be introduced to be identified from, for example, the state of the hand 61, which is a part of the body of the object introducer 60, such as holding, grasping, pinching, or pointing at the product 70. Consequently, even in a case where a plurality of products 70 appears in the captured image data, the product 70 to be introduced can be identified on the basis of the state of the hand 61.

Furthermore, in the imaging control apparatus 22 according to each embodiment, the identification unit 22a may hypothetically identify, as a substitute for a true object to be introduced, the hand 61 as the object to be introduced. By identifying the hand as a substitute for the object to be introduced when identifying the product 70 to be introduced, identification processing is facilitated.

In imaging, various subjects appear on the imaging screen, and thus it is difficult to determine which product 70 is an object to be introduced in, for example, a product review video. Therefore, by identifying the product 70 to be introduced from the state of the hand 61 of the object introducer 60 that is easily detected by image analysis processing or the like, the object to be introduced can be easily identified from the products 70 appearing in the captured image.

In the imaging control apparatus 22 according to each embodiment, the example has been described in which the imaging control is the imaging operation control, that is, the control of imaging operation by the optical system for concentrating subject light onto the image sensor 14 of the imaging unit 13 and the imaging unit 13 (see steps S105 and S109 in FIG. 14).

For example, autofocus control, AE control (aperture control, SS control, and gain control), etc. appropriate to the target subject are performed. Consequently, imaging operation in which the intention of the object introducer 60 is reflected can be performed without direct operation of the imaging device 1 during video shooting.

For example, by performing autofocus control on the target subject appropriate for the current scene, imaging focused on the product 70 in the product introduction scene and on the object introducer 60 in the performance scene can be performed in the product review video.

In the imaging control apparatus 22 according to the embodiments, the example has been described in which the imaging control is the captured image processing control, that is, the control of image processing on the captured image data (see S105 and S109 in FIG. 12). For example, white balance processing control, contrast adjustment processing control, image effect processing control, etc. suited to the region of the target subject are performed on the captured image data.

Consequently, image signal processing suitable for the current scene is executed, and signal processing in which the intention of the object introducer 60 is reflected is performed without direct operation of the imaging device 1 during video shooting.

The imaging control apparatus 22 according to each embodiment associates the metadata related to the result of the selection of the selection unit 22b with the captured image data (see FIG. 14).

This facilitates the extraction of the performance scene and the extraction of the product introduction scene on the captured image data as a video during reproduction and editing.

Furthermore, information associated with the captured image data as the metadata also includes information on the error flag indicating that the selection unit 22b is in the determination impossible state. Consequently, for example, by deleting frames to which the error flag is attached after recording, a section in which proper video shooting could not be performed can be efficiently deleted.

That is, the metadata related to the result of the selection of the selection unit 22b improves the efficiency of editing the captured image data as a video and facilitates a reproduction work for checking.

Furthermore, the imaging device 1 according to the embodiments is provided as an imaging device that achieves the above-described effects by including the above-described imaging control apparatus 22.

The imaging device 1 includes the presentation unit 18, and the presentation unit 18 presents the fact that the selection unit 22b is in the determination impossible state (see step S106 in FIG. 14, steps S202, S203, and S204 in FIG. 17, etc.).

Consequently, the determination impossible state is displayed on the display unit of the presentation unit 18. Furthermore, a sound providing the notification of the determination impossible state may be emitted from the audio output of the presentation unit 18.

Consequently, the object introducer 60 can notice that the imaging device 1 is in the determination impossible state. For example, in a case where the object introducer 60 did not notice that the imaging device 1 had come to be in the determination impossible state during shooting, a video shot may not have undergone imaging control reflecting the intention of the object introducer 60. In this case, the object introducer 60 needs to shoot a video from scratch, and extra work and time are consumed. Therefore, by notifying the object introducer 60 of the determination impossible state so that he or she notices that in the middle, the convenience of the object introducer 60 can be improved.

Note that by the notification of the determination impossible state by a sound from the speaker of the presentation unit 18, the object introducer 60 can be made aware of the error even when the display unit of the imaging device 1 does not face the object introducer 60 side.

More specifically, the presentation unit 18 presents a control impossible state when the distance Loc from the imaging device 1 to the object to be introduced (the product 70) is less than the shortest imaging processing.

For example, when the product 70 to be introduced is at a distance shorter than the shortest imaging distance, the focus lens cannot be moved to focus on the product 70, and the product 70 undergoes blurring. Then, by notifying the object introducer 60 of the determination impossible state so that he or she notices that in the middle, the convenience of the object introducer 60 is improved.

In particular, the display of the control impossible state to the object introducer 60 (see step S106 in FIG. 14 etc.) allows the object introducer 60 to visually recognize it to notice the determination impossible state. Furthermore, notification by a display on the display unit of the imaging device 1 instead of notification by a sound can prevent needless sounds from being recorded during shooting.

The program according to the embodiments is a program for causing, for example, a CPU, a DSP, or the like, or a device including them to execute the processing in FIG. 14 and FIGS. 17 to 21.

That is, the program according to the embodiments is a program for causing an imaging control apparatus to execute identification processing to identify an object to be introduced (e.g., the product 70) and an object introducer 60 who introduces the object to be introduced individually as subjects on the basis of captured image data obtained by the imaging unit 13 of the imaging device 1, selection processing to select one of the object to be introduced and the object introducer as a target subject on the basis of the positional relationship between at least any two of the object to be introduced (the product 70), the object introducer 60, and the imaging device 1, and imaging control processing to perform imaging control appropriate to the subject selected as the target subject in the selection processing.

The program as described above allows the above-described imaging control apparatus 22 to be implemented in the imaging device 1 such as the digital video camera 1A, the digital still camera 1B having a video shooting function, or the mobile terminal 1C such as a smartphone.

The program as described above may be recorded in advance in an HDD as a recording medium built in a device such as a computer device, a ROM in a microcomputer including a CPU, or the like.

Alternatively, the program may be stored (recorded) temporarily or permanently on a removable recording medium such as a flexible disk, a compact disc read-only memory (CD-ROM), a magnet optical (MO) disk, a digital versatile disc (DVD), a Blue-ray Disc (registered trademark), a magnetic disk, a semiconductor memory, or a memory card. Such a removable recording medium may be provided as so-called package software.

Furthermore, the program as described above may be installed from a removable recording medium to a personal computer or the like, or downloaded from a download site via a network such as a local-area network (LAN) or the Internet.

Furthermore, the program as described above is suitable for the widespread provision of the imaging control apparatus according to the embodiments. For example, by downloading the program to a personal computer, a portable information processing device, a mobile phone, a game device, a video device, a personal digital assistant (PDA), etc., the personal computer etc. can be made to function as the imaging control apparatus of the present disclosure.

Note that the effects described in the present description are merely examples and nonlimiting, and other effects may be included.

Furthermore, the description of the embodiments described in the present description is merely an example, and the present technology is not limited to the above-described embodiments. Therefore, it goes without saying that in addition to the above-described embodiments, various changes can be made depending on design and the like without departing from the technical idea of the present technology.

The present technology can also have the following configurations.

(1)

An imaging control apparatus including:
an identification unit that identifies an object to be introduced and an object introducer who introduces the object to be introduced individually as subjects on the basis of captured image data obtained by an imaging unit of an imaging device;
a selection unit that selects one of the object to be introduced and the object introducer as a target subject on the basis of a positional relationship between at least any two of the object to be introduced, the object introducer, and the imaging device; and
an imaging control unit that performs imaging control appropriate to a subject selected as the target subject by the selection unit.

(2)

The imaging control apparatus according to (1) above, in which
the selection unit selects one of the object to be introduced and the object introducer as the target subject on the basis of a positional relationship between the object to be introduced and the object introducer.

(3)

The imaging control apparatus according to (1) above, in which
the selection unit selects one of the object to be introduced and the object introducer as the target subject on the basis of a positional relationship between the object to be introduced and the imaging device.

(4)

The imaging control apparatus according to any one of (1) to (3) above, in which
the identification unit identifies the object to be introduced by recognizing the object to be introduced on the basis of the captured image data.

(5)

The imaging control apparatus according to any one of (1) to (4) above, in which
the identification unit recognizes a hand of the object introducer on the basis of the captured image data, and identifies the object to be introduced on the basis of a result of the recognition of the hand.

(6)

The imaging control apparatus according (5) above, in which
the identification unit hypothetically identifies, as a substitute for a true object to be introduced, the hand as the object to be introduced.

(7)

The imaging control apparatus according to (5) or (6) above, in which
the identification unit identifies the object to be introduced on the basis of a state of the hand.

(8)

The imaging control apparatus according to any one of (5) to (7) above, in which
the selection unit selects one of the object to be introduced and the object introducer as the target subject on the basis of the object to be introduced and a positional relationship between the object to be introduced and the object introducer depending on a state of the hand of the object introducer.

(9)

The imaging control apparatus according to (7) or (8) above, in which
the state of the hand is a state in which the hand of the object introducer is in contact with the object to be introduced.

(10)

The imaging control apparatus according to (7) or (8) above, in which
the state of the hand is a state in which the hand of the object introducer is pointing at the object to be introduced.

(11)

The imaging control apparatus according to (1) above, in which
the selection unit selects one of the object to be introduced and the object introducer as the target subject on the basis of a distance relationship between at least any two of the object to be introduced, the object introducer, and the imaging device, which is the positional relationship.

(12)

The imaging control apparatus according to (11) above, in which
the distance relationship is a distance between the object to be introduced and the imaging device.

(13)

The imaging control apparatus according to (11) above, in which
the distance relationship is a distance between the object introducer and the object to be introduced.

(14)

The imaging control apparatus according to (11) above, in which
the distance relationship is distances between the object introducer, the object to be introduced, and the imaging device.

(15)

The imaging control apparatus according to (11) above, in which
the selection unit detects the distance relationship on the basis of the ratio of the region of at least one of the object to be introduced or the object introducer to the entire frame of the captured image data.

(16)

The imaging control apparatus according to any one of (1) to (15) above, further including:
a presentation control unit that performs presentation control to present, to the object introducer, a difficult control state in which the imaging control is difficult in a case where a distance between the imaging device and the object to be introduced is shorter than a predetermined value.

(17)

The imaging control apparatus according to any one of (1) to (16) above, further including:
an association control unit that performs association control to associate metadata related to a result of the selection by the selection unit with the captured image data.

(18)

An imaging device including:
an imaging unit;
an identification unit that identifies an object to be introduced and an object introducer who introduces the object to be introduced on the basis of captured image data obtained by the imaging unit;
a selection unit that selects one of the object to be introduced and the object introducer as a target subject on the basis of a positional relationship between at least any two of the object to be introduced, the object introducer, and the imaging device; and
an imaging control unit that performs imaging control on a subject selected as the target subject by the selection unit.

(19)

An imaging control method including:
identification processing to identify an object to be introduced and an object introducer who introduces the object to be introduced individually as subjects on the basis of captured image data obtained by an imaging unit of an imaging device;
selection processing to select one of the object to be introduced and the object introducer as a target subject on the basis of a positional relationship between at least any two of the object to be introduced, the object introducer, and the imaging device; and
imaging control processing to perform imaging control appropriate to a subject selected as the target subject in the selection unit.

(20)

A program that causes an imaging control apparatus to execute:
identification processing to identify an object to be introduced and an object introducer who introduces the object to be introduced individually as subjects on the basis of captured image data obtained by an imaging unit of an imaging device;
selection processing to select one of the object to be introduced and the object introducer as a target subject on the basis of a positional relationship between at least any two of the object to be introduced, the object introducer, and the imaging device; and
imaging control processing to perform imaging control appropriate to a subject selected as the target subject in the selection unit.

REFERENCE SIGNS LIST

1 Imaging device
11 Optical system
13 Imaging unit
14 Image sensor
18 Presentation unit
22 Imaging control apparatus
22a Identification unit
22b Selection unit
22c Imaging control unit
22d Presentation control unit
22e Association control unit
61 Hand
62 Face
70 Product

The invention claimed is:

1. An imaging control apparatus comprising:
processing circuitry configured to:
identify an object to be introduced and an object introducer who introduces the object to be introduced individually as subjects on a basis of captured image data obtained by imaging circuitry of an imaging device;
select one of the object to be introduced and the object introducer as a target subject on a basis of a positional relationship between at least any two of the object to be introduced, the object introducer, and the imaging device; and
perform imaging control appropriate to a subject selected as the target subject,
wherein the processing circuitry is further configured to identify a portion of the object introducer on a basis of the captured image data and identifies the object to be introduced on a basis of a result of the recognition of the portion.

2. The imaging control apparatus according to claim 1, wherein the processing circuitry is further configured to select
one of the object to be introduced and the object introducer as the target subject on a basis of a positional relationship between the object to be introduced and the object introducer.

3. The imaging control apparatus according to claim 1, wherein the processing circuitry is further configured to select
one of the object to be introduced and the object introducer as the target subject on a basis of a positional relationship between the object to be introduced and the imaging device.

4. The imaging control apparatus according to claim 1, wherein the processing circuitry is further configured to identify
the object to be introduced by recognizing the object to be introduced on a basis of the captured image data.

5. The imaging control apparatus according to claim 1, wherein the processing circuitry is further configured to recognize
a hand of the object introducer on a basis of the captured image data, and identifies the object to be introduced on a basis of a result of the recognition of the hand.

6. The imaging control apparatus according to claim 5, wherein the processing circuitry is further configured to
hypothetically identify, as a substitute for a true object to be introduced, the hand as the object to be introduced.

7. The imaging control apparatus according to claim 5, wherein the processing circuitry is further configured to identify
the object to be introduced on a basis of a state of the hand.

8. The imaging control apparatus according to claim 5, wherein the processing circuitry is further configured to select
one of the object to be introduced and the object introducer as the target subject on a basis of the object to be introduced and a positional relationship between the object to be introduced and the object introducer depending on a state of the hand of the object introducer.

9. The imaging control apparatus according to claim 7, wherein
the state of the hand is a state in which the hand of the object introducer is in contact with the object to be introduced.

10. The imaging control apparatus according to claim 7, wherein
the state of the hand is a state in which the hand of the object introducer is pointing at the object to be introduced.

11. The imaging control apparatus according to claim 1, wherein the processing circuitry is further configured to select
one of the object to be introduced and the object introducer as the target subject on a basis of a distance relationship between at least any two of the object to be introduced, the object introducer, and the imaging device, which is the positional relationship.

12. The imaging control apparatus according to claim 11, wherein
the distance relationship is a distance between the object to be introduced and the imaging device.

13. The imaging control apparatus according to claim 11, wherein
the distance relationship is a distance between the object introducer and the object to be introduced.

14. The imaging control apparatus according to claim 11, wherein
the distance relationship is distances between the object introducer, the object to be introduced, and the imaging device.

15. The imaging control apparatus according to claim 11, wherein the processing circuitry is further configured to detect
the distance relationship on a basis of a ratio of a region of at least one of the object to be introduced or the object introducer to an entire frame of the captured image data.

16. The imaging control apparatus according to claim 1, wherein the processing circuitry is further configured to perform
presentation control to present, to the object introducer, a control state in which the imaging control is not available in a case where a distance between the imaging device and the object to be introduced is shorter than a predetermined value.

17. The imaging control apparatus according to claim 1, wherein the processing circuitry is further configured to perform
association control to associate metadata related to a result of the selection by the selection unit with the captured image data.

18. An imaging device comprising:
imaging circuitry; and
processing circuitry configured to:
identify an object to be introduced and an object introducer who introduces the object to be introduced on a basis of captured image data obtained by the imaging circuitry;
select one of the object to be introduced and the object introducer as a target subject on a basis of a positional relationship between at least any two of the object to be introduced, the object introducer, and the imaging device; and
perform imaging control on a subject selected as the target subject,
wherein the processing circuitry is further configured to identify a portion of the object introducer on a basis of the captured image data and identifies the object to be introduced on a basis of a result of the recognition of the portion.

19. An imaging control method comprising:
identifying, using processing circuitry, an object to be introduced and an object introducer who introduces the object to be introduced individually as subjects on a basis of captured image data obtained by imaging circuitry of an imaging device;
selecting, using the processing circuitry, one of the object to be introduced and the object introducer as a target subject on a basis of a positional relationship between at least any two of the object to be introduced, the object introducer, and the imaging device; and
performing, using the processing circuitry, imaging control appropriate to a subject selected as the target subject in the selecting,
wherein the identifying further includes identifying a portion of the object introducer on a basis of the captured image data and identifying the object to be introduced on a basis of a result of the recognition of the portion.

20. A non-transitory computer readable medium having stored thereon a program that when executed by an imaging control apparatus causes the imaging control apparatus to execute a method comprising:
  identifying an object to be introduced and an object introducer who introduces the object to be introduced individually as subjects on a basis of captured image data obtained by imaging circuitry of an imaging device;
  selecting one of the object to be introduced and the object introducer as a target subject on a basis of a positional relationship between at least any two of the object to be introduced, the object introducer, and the imaging device; and
  performing imaging control appropriate to a subject selected as the target subject in the selecting
  wherein the identifying further includes identifying a portion of the object introducer on a basis of the captured image data and identifying the object to be introduced on a basis of a result of the recognition of the portion.

* * * * *